US012806799B2

(12) United States Patent
Wada

(10) Patent No.: US 12,806,799 B2
(45) Date of Patent: Nov. 24, 2026

(54) DEVICE FOR ACQUIRING POSITION DATA PERTAINING TO WORKPIECE, CONTROL DEVICE, ROBOT SYSTEM, METHOD, AND COMPUTER PROGRAM

(71) Applicant: Fanuc Corporation, Minamitsuru-gun (JP)

(72) Inventor: Jun Wada, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 24 days.

(21) Appl. No.: 18/871,271

(22) PCT Filed: Jun. 21, 2022

(86) PCT No.: PCT/JP2022/024747
§ 371 (c)(1),
(2) Date: Dec. 3, 2024

(87) PCT Pub. No.: WO2023/248353
PCT Pub. Date: Dec. 28, 2023

(65) Prior Publication Data
US 2025/0353189 A1 Nov. 20, 2025

(51) Int. Cl.
*B25J 13/08* (2006.01)
*B25J 9/16* (2006.01)
(Continued)

(52) U.S. Cl.
CPC ........... *B25J 13/088* (2013.01); *B25J 9/1671* (2013.01); *B25J 19/023* (2013.01); *G06T 7/75* (2017.01); *G06T 2207/30164* (2013.01)

(58) Field of Classification Search
CPC ...... B25J 13/088; B25J 19/023; B25J 9/1671; B25J 9/1697; G05B 2219/40053;
(Continued)

(56) References Cited

U.S. PATENT DOCUMENTS

2019/0184570 A1 6/2019 Yung et al.
2025/0214249 A1* 7/2025 Hosomi ................. B25J 9/1697

FOREIGN PATENT DOCUMENTS

JP 2010152664 A 7/2010
JP 2013119121 A 6/2013
(Continued)

OTHER PUBLICATIONS

International Search Report (PCT/ISA/210) with translation and Written Opinion (PCT/ISA/237) mailed Sep. 13, 2022, by the Japan Patent Office as the International Searching Authority for International Application No. PCT/JP2022/024747. (8 pages).

*Primary Examiner* — Jerrod Irvin Davis
(74) *Attorney, Agent, or Firm* — BUCHANAN INGERSOLL & ROONEY PC

(57) ABSTRACT

This device that acquires position data pertaining to a workpiece on the basis of detection data from a shape detection sensor includes: a position data acquisition unit that matches a workpiece model to shape data pertaining to the workpiece included in the detection data, the workpiece model modeling the workpiece and being such that a confirmation region corresponding to a region that cannot be entered is established therein, to thereby acquire the position data; and a position data cancellation unit that invalidates the position data acquired by the position data acquisition unit if shape data pertaining to an object included in the detection data is present in the confirmation region established in the workpiece model that is matched to the shape data pertaining to the workpiece by the position data acquisition unit.

15 Claims, 20 Drawing Sheets

(51) Int. Cl.
*B25J 19/02* (2006.01)
*G06T 7/73* (2017.01)

(58) Field of Classification Search
CPC ........... G05B 2219/40564; G05B 2219/45063; G06T 2207/10028; G06T 2207/30164; G06T 7/75
See application file for complete search history.

(56) References Cited

FOREIGN PATENT DOCUMENTS

| | | | |
|---|---|---|---|
| JP | 2017102529 | A | 6/2017 |
| WO | 2022107684 | A1 | 5/2022 |

* cited by examiner

DD

DD

DD

DEVICE FOR ACQUIRING POSITION DATA PERTAINING TO WORKPIECE, CONTROL DEVICE, ROBOT SYSTEM, METHOD, AND COMPUTER PROGRAM

CROSS REFERENCE TO RELATED APPLICATIONS

This is the U.S. National Phase application of PCT/JP2022/024747, filed Jun. 21, 2022, the disclosure of this application being incorporated herein by reference in its entirety for all purposes.

FIELD OF THE INVENTION

The present disclosure relates to a device, a controller, a robot system, a method, and a computer program for acquiring position data of a workpiece.

BACKGROUND OF THE INVENTION

There is known a device that acquires position data of a workpiece by matching a workpiece model obtained by modeling the workpiece with detection data of a shape detection sensor that detects a shape of the workpiece (e.g., PTL 1).

PATENT LITERATURE

PTL 1: JP 2017-102529 A

SUMMARY OF THE INVENTION

In the related art, there has been a case where a workpiece model is erroneously matched with detection data of a shape detection sensor. In this case, accurate position data of the workpiece cannot be acquired, and work on the workpiece may not be accurately performed.

According to an aspect of the present disclosure, there is provided a device configured to acquire position data of a workpiece based on detection data of a shape detection sensor configured to detect shapes of an object and the workpiece, the workpiece being adjacent to the object and having an area where the object cannot enter, the device including: a position data acquiring unit configured to acquire the position data by matching a workpiece model, which models the workpiece and in which a verification area corresponding to the area where the object cannot enter is defined, with shape data of the workpiece included in the detection data; and a position data canceling unit configured to invalidate the position data acquired by the position data acquiring unit when shape data of the object included in the detection data is present in the verification area defined in the workpiece model matched with the shape data of the workpiece by the position data acquiring unit.

According to another aspect of the present disclosure, there is provided a method of acquiring position data of a workpiece based on detection data of a shape detection sensor configured to detect shapes of an object and the workpiece, the workpiece being adjacent to the object and having an area where the object cannot enter, the method including: acquiring, by a processor, the position data by matching a workpiece model, which models the workpiece and in which a verification area corresponding to the area where the object cannot enter is defined, with shape data of the workpiece included in the detection data; and invalidating, by the processor, the acquired position data when shape data of the object included in the detection data is present in the verification area defined in the workpiece model matched with the shape data of the workpiece.

According to the present disclosure, it is possible to avoid causing a robot to perform work on a workpiece using position data acquired as a result of mismatch between a workpiece model and shape data caused by erroneously matching the workpiece model with the shape data. As a result, accuracy of work by the robot can be improved.

DETAILED DESCRIPTION OF EMBODIMENTS OF THE INVENTION

Figure 1:
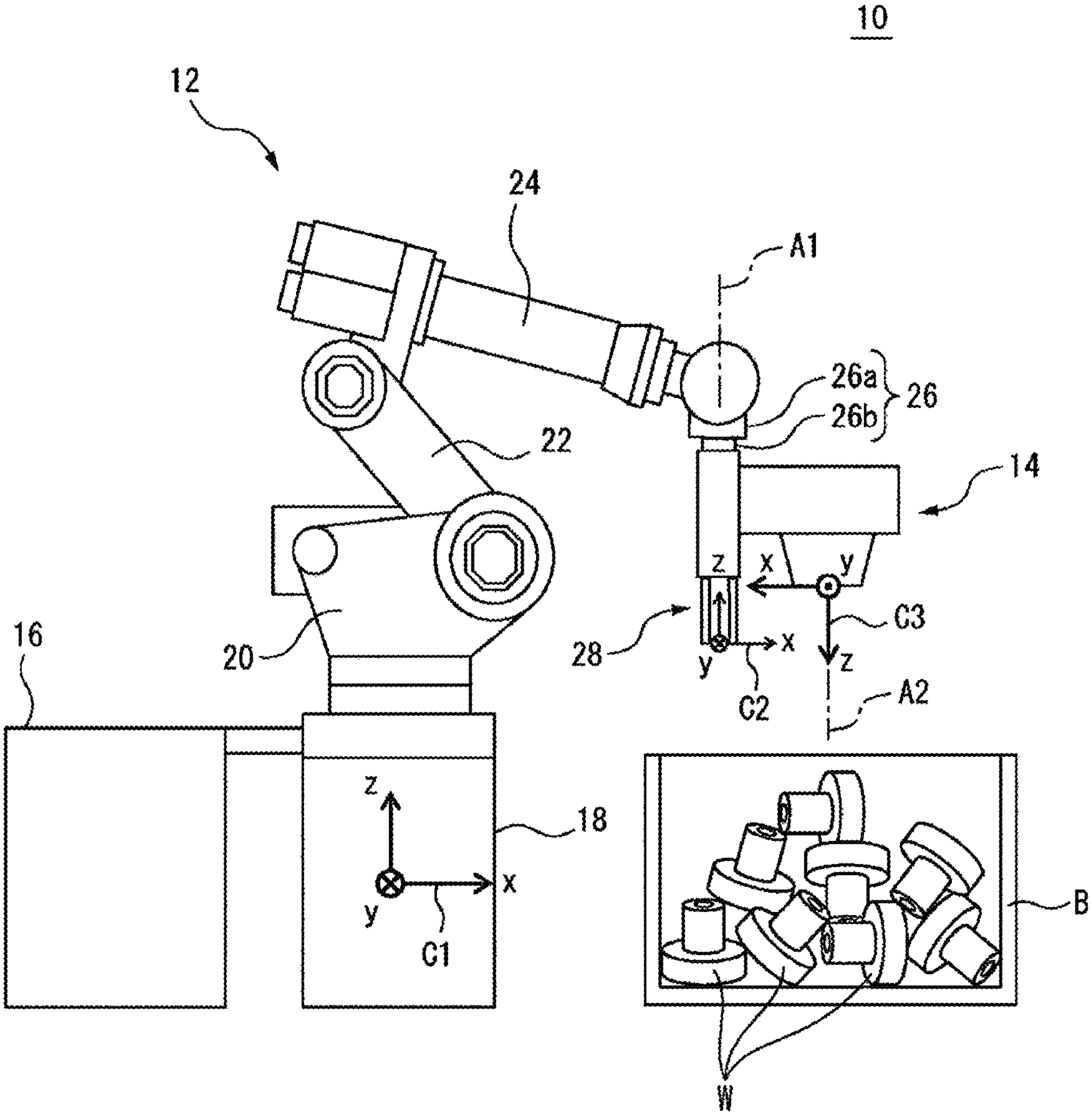
FIG. 1 is a schematic view of a robot system according to an embodiment.

Embodiments of the present disclosure will be described in detail below with reference to the drawings. Note that in various embodiments described below, the same elements are denoted with the same reference numerals, and redundant description will be omitted. First, a robot system 10 according to an embodiment will be described with reference to FIGS. 1 and 2. The robot system 10 includes a robot 12, a shape detection sensor 14, and a controller 16.

In the present embodiment, the robot 12 is a vertical articulated robot and includes a robot base 18, a swivel body 20, a lower arm 22, an upper arm 24, a wrist 26, and an end effector 28. The robot base 18 is fixed on the floor of a work cell. The swivel body 20 is provided on the robot base 18 so as to be able to swivel about a vertical axis.

The lower arm 22 is provided on the swivel body 20 so as to be rotatable about a horizontal axis, and the upper arm 24 is rotatably provided at a distal end portion of the lower arm 22. The wrist 26 includes a wrist base 26*a* provided at a distal end portion of the upper arm 24 so as to be rotatable about two axes orthogonal to each other, and a wrist flange 26*b* provided on the wrist base 26*a* so as to be rotatable about a wrist axis A1.

The end effector 28 is removably attached to the wrist flange 26*b*. The end effector 28 is, for example, a robot hand capable of gripping a workpiece W, a welding torch for welding the workpiece W, a laser process head for subjecting the workpiece W to a laser process, or the like, and performs predetermined work (workpiece handling, welding, or laser process) on the workpiece W.

Figure 2:
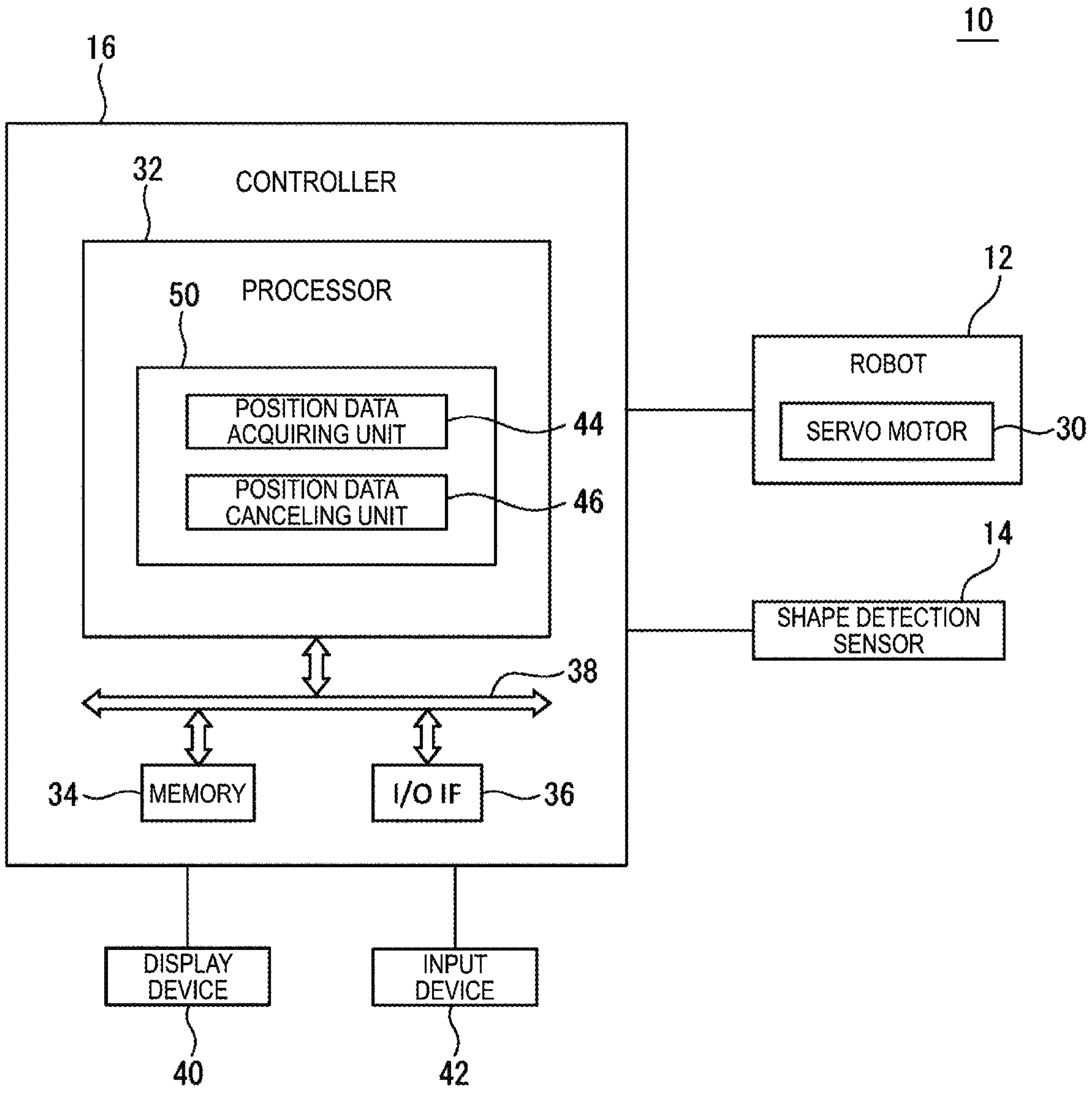
FIG. 2 is a block diagram of the robot system illustrated in FIG. 1.

Each constituent element (the robot base 18, the swivel body 20, the lower arm 22, the upper arm 24, and the wrist 26) of the robot 12 is provided with a servo motor 30 (FIG. 2). These servo motors 30 cause each movable element (the swivel body 20, the lower arm 22, the upper arm 24, the wrist 26, and the wrist flange 26*b*) of the robot 12 to rotate in response to a command from the controller 16. As a result, the robot 12 can move and arrange the end effector 28 at a freely-selected position.

The shape detection sensor 14 detects a shape of an object such as the workpiece W. In the present embodiment, the shape detection sensor 14 is a three-dimensional vision sensor including an imaging sensor (CMOS, CCD, or the like) and an optical lens (collimator lens, focus lens, or the like) that guides a subject image to the imaging sensor, and is fixed to the end effector 28 (or the wrist flange 26*b*).

The shape detection sensor 14 is configured to image a subject image along an optical axis A2 and measure a distance d to the subject image. Note that the shape detection sensor 14 may be fixed to the end effector 28 such that the optical axis A2 and the wrist axis A1 are parallel to (or orthogonal to) each other. The shape detection sensor 14 supplies detected detection data DD to the controller 16.

As illustrated in FIG. 1, a robot coordinate system C1 and a tool coordinate system C2 are set for the robot 12. The robot coordinate system C1 is a control coordinate system for controlling an operation of each movable element of the robot 12. In the present embodiment, the robot coordinate system C1 is fixed with respect to the robot base 18 such that the origin is arranged at the center of the robot base 18 and the z axis thereof is parallel to (specifically, coincides with) a swivel axis of the swivel body 20.

On the other hand, the tool coordinate system C2 is a control coordinate system that determines a position and orientation of the end effector 28 in the robot coordinate system C1. In the present embodiment, the tool coordinate system C2 is set with respect to the end effector 28 such that the origin (so-called TCP) is arranged at a work position (e.g., a workpiece gripping position, a welding position, or a laser beam emission port) of the end effector 28 and the z axis thereof is parallel to (specifically, coincides with) the wrist axis A1.

When moving the end effector 28, the controller 16 sets the tool coordinate system C2 in the robot coordinate system C1, and generates a command for each of the servo motors 30 of the robot 12 so as to arrange the end effector 28 at a position and orientation represented by the set tool coordinate system C2. In this way, the controller 16 can position the end effector 28 at a freely-selected position and orientation in the robot coordinate system C1.

On the other hand, a sensor coordinate system C3 is set for the shape detection sensor 14. The sensor coordinate system C3 is a control coordinate system C that determines a position and orientation (i.e., a position and direction of the optical axis A2) of the shape detection sensor 14 in the robot coordinate system C1. In the present embodiment, the sensor coordinate system C3 is set with respect to the shape detection sensor 14 such that the origin thereof is arranged at the center of the imaging sensor of the shape detection sensor 14 and the z axis thereof is parallel to (specifically, coincides with) the optical axis A2. The sensor coordinate system C3 determines coordinates of each pixel of detection data DD (alternatively, the imaging sensor) detected by the shape detection sensor 14.

The positional relationship between the sensor coordinate system C3 and the tool coordinate system C2 is known through calibration, and thus, the coordinates of the sensor coordinate system C3 and the coordinates of the tool coordinate system C2 can be mutually transformed through a known transformation matrix (e.g., a homogeneous transformation matrix). Furthermore, since the positional relationship between the tool coordinate system C2 and the robot coordinate system C1 is known, the coordinates of the sensor coordinate system C3 and the coordinates of the robot coordinate system C1 can be mutually transformed through the tool coordinate system C2. That is, the position and orientation (specifically, coordinates of the sensor coordinate system C3) of the shape detection sensor 14 in the robot coordinate system C1 are known.

The controller 16 controls an operation of the robot 12. Specifically, as illustrated in FIG. 2, the controller 16 is a computer including a processor 32, a memory 34, and an I/O interface 36. The processor 32 includes a CPU, a GPU, or the like, is communicably connected to the memory 34 and the I/O interface 36 via a bus 38, and performs arithmetic processing for implementing various functions described below while communicating with these components.

The memory 34 includes a RAM, a ROM, or the like and temporarily or permanently stores various types of data. The memory 34 may be constituted by a storage medium such as a volatile memory, a nonvolatile memory, a magnetic storage medium, or an optical storage medium. The I/O interface 36 includes, for example, an Ethernet (registered trademark) port, a USB port, an optical fiber connector, or an HDMI (registered trademark) terminal and communicates data with external devices by wire or wirelessly through a command from the processor 32. Each of the servo motors 30 and the shape detection sensor 14 of the robot 12 are communicably connected to the I/O interface 36.

In addition, the controller 16 is provided with a display device 40 and an input device 42. The display device 40 and the input device 42 are communicably connected to the I/O interface 36. The display device 40 includes a liquid crystal display, an organic EL display, or the like, and visibly displays various types of data through a command from the processor 32.

The input device 42 includes a push button, a switch, a keyboard, a mouse, a touch panel, or the like, and receives an input of data from an operator. Note that the display device 40 and the input device 42 may be integrally incorporated in a housing of the controller 16, or may be externally attached to the housing as one computer (a PC, or the like) separate from the housing of the controller 16.

Figure 3:
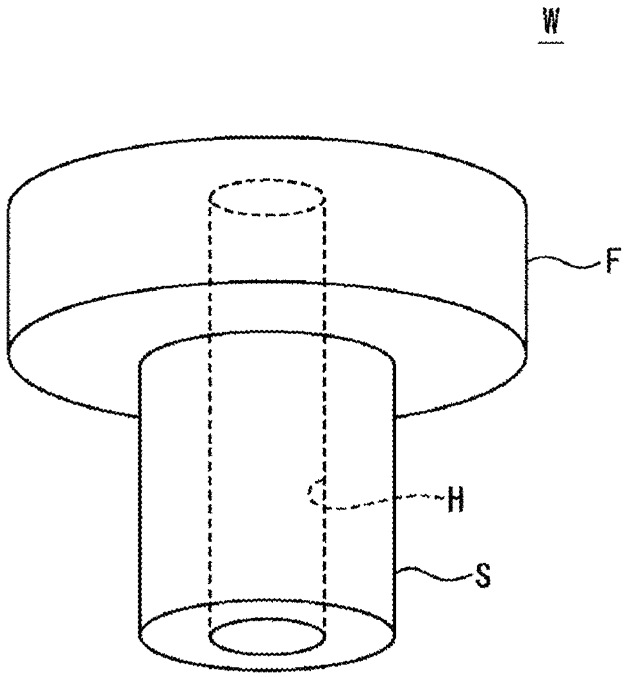
FIG. 3 is a perspective view of a workpiece according to an embodiment.

In the present embodiment, the processor 32 acquires position data of the workpiece W in the robot coordinate system C1 based on the detection data DD of the shape detection sensor 14 that detects shapes of the plurality of workpieces W stacked in bulk in a container B. As illustrated in FIG. 3, in the present embodiment, each workpiece W has a shaft portion S, a flange portion F fixed to one end of the shaft portion S, and a hole H penetrating through the shaft portion S and the flange portion F in an axial direction.

When the workpieces W are stacked in bulk in the container B, one workpiece $W_1$ and another workpiece $W_2$ adjacent to the workpiece $W_1$ are in contact with each other, but members of another workpiece $W_2$ (that is, the shaft portion S and the flange portion F) cannot enter the hole H of the workpiece $W_1$. That is, in the present embodiment, each workpiece W has the hole H as an area where another workpiece W (object) cannot enter.

Subsequently, functions of the robot system 10 will be described with reference to FIG. 4. The flow illustrated in FIG. 4 starts when the processor 32 receives a work start command from an operator, a host controller, or a computer program PG. In step S1, the processor 32 acquires the detection data DD detected by the shape detection sensor 14.

Specifically, the processor 32 operates the robot 12 to position the shape detection sensor 14 at an imaging position at which the workpieces W stacked in bulk in the container B fall within a detection range of the shape detection sensor 14. Then, the processor 32 operates the shape detection sensor 14 to image the workpiece W in the container B, thereby detecting the detection data DD in which the workpiece W is imaged.

Figure 5:
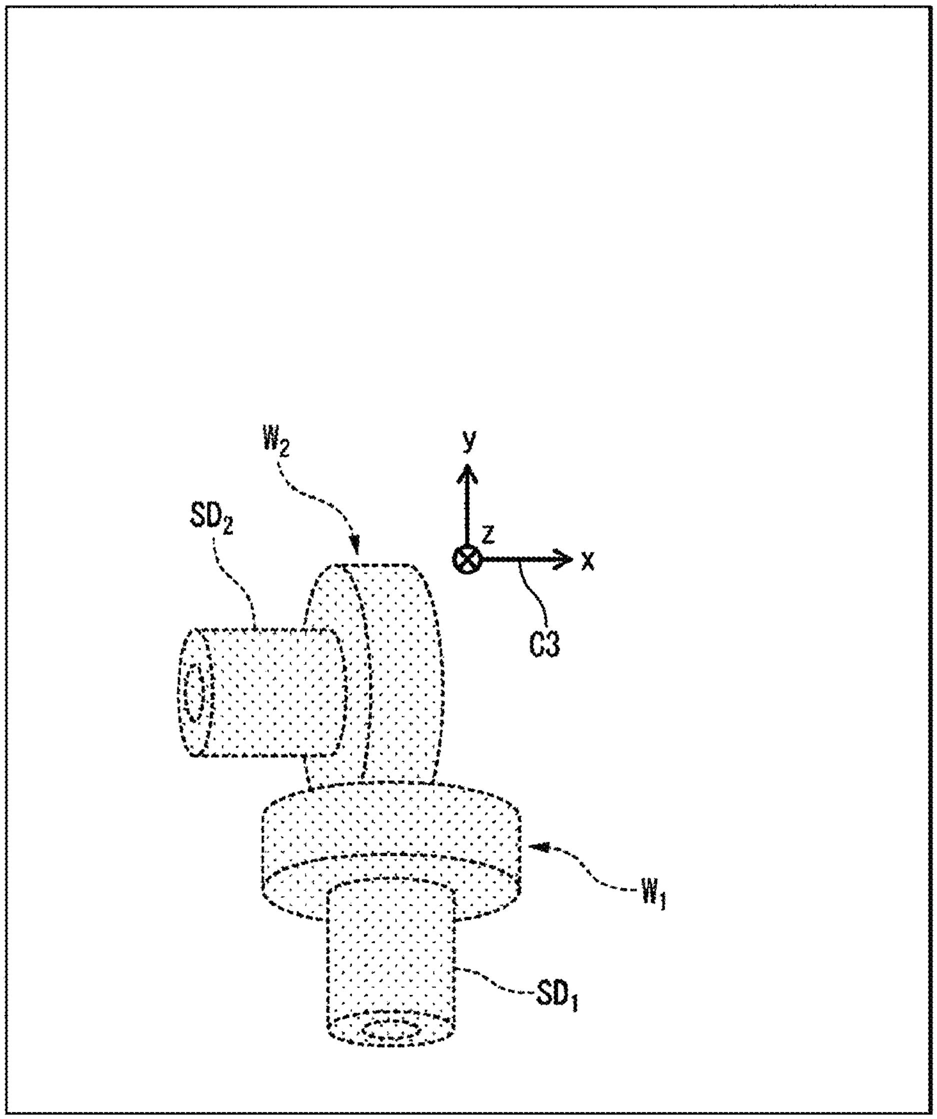
FIG. 5 is an example of detection data detected by a shape detection sensor.

FIG. 5 illustrates an example of an image prepared by imaging the detection data DD. Note that, in the detection data DD illustrated in FIG. 5, a state in which only two workpieces $W_1$ and $W_2$ adjacent to each other among the workpieces W in the container B are imaged is illustrated from the viewpoint of easy understanding, but it should be understood that three or more workpieces W stacked in bulk may actually be imaged in the detection data DD.

In the present embodiment, the detection data DD is three-dimensional point cloud image data and includes shape data $SD_n$ (n=1, 2, 3, . . . ) of a plurality of workpieces $W_n$ (in FIG. 5, shape data $SD_1$ of the workpiece $W_1$ and shape data $SD_2$ of the workpiece $W_2$). The shape data $SD_n$ has a point cloud indicating a visual feature (an edge, a surface, and the like) of the workpiece $W_n$, and each point constituting the point cloud has information on the distance d described above. Therefore, each point constituting the point cloud of the shape data $SD_n$ can be represented as three-dimensional coordinates ($X_S$, $Y_S$, $Z_S$) in the sensor coordinate system C3. The processor 32 acquires the detection data DD detected by the shape detection sensor 14 from the shape detection sensor 14.

Figure 6:
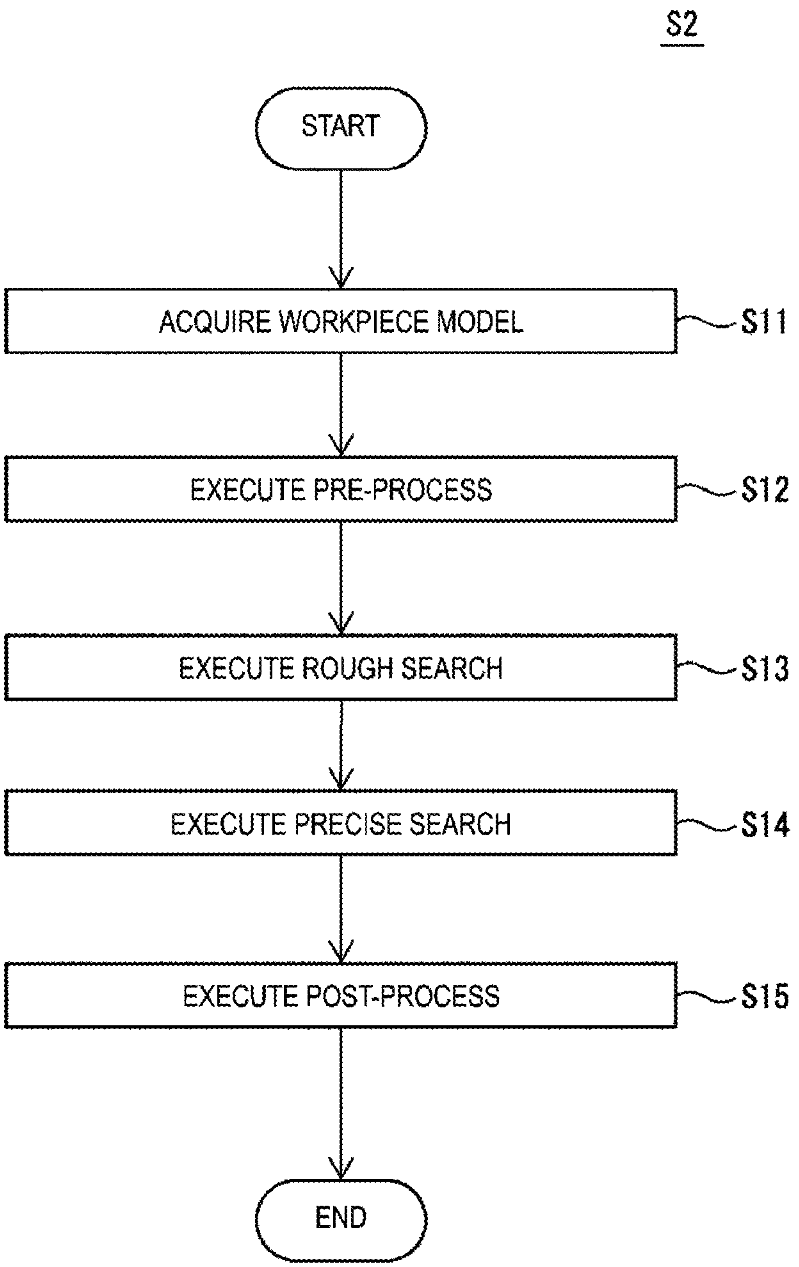
FIG. 6 is a flowchart illustrating an example of the flow of step S2 in FIG. 4.

In step S2, the processor 32 acquires position data PD of the workpiece W. That is, in the present embodiment, the processor 32 functions as a position data acquiring unit 44 (FIG. 14) configured to acquire the position data PD of the workpiece W. This step S2 is described with reference to FIG. 6. The processor 32 functions as the position data acquiring unit 44 and executes the flow of step S2 illustrated in FIG. 6.

Figure 7:
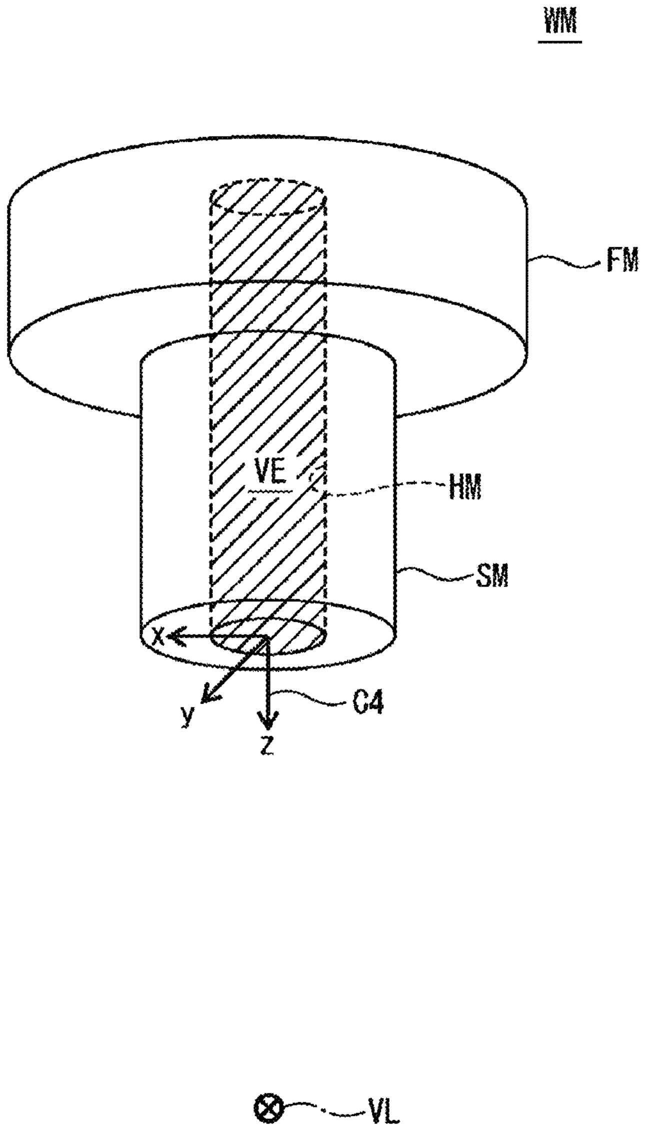
FIG. 7 illustrates a perspective view of a workpiece model obtained by modeling the workpiece of FIG. 3.

After the start of step S2, in step S11, the processor 32 acquires a workpiece model WM modeling the workpiece W. FIG. 7 illustrates an example of the workpiece model WM. The workpiece model WM includes a shaft portion model SM modeling the shaft portion S, a flange portion model FM modeling the flange portion F, and a hole model HM modeling the hole H.

The workpiece model WM includes, for example, a CAD model $WM_C$ of the workpiece W and a point cloud model $WM_P$ representing model components (an edge, a surface, and the like) of the CAD model $WM_C$ as a point cloud (or normal line). The CAD model $WM_C$ is a three-dimensional CAD model and is created in advance by the operator using a CAD device (not illustrated). The processor 32 may generate the point cloud model $WM_P$ by acquiring the CAD model $WM_C$ from the CAD device and imparting the point cloud to the model components of the CAD model $WM_C$ in accordance with a predetermined image generation algorithm.

In the present embodiment, in step S11, the processor 32 generates each of workpiece models WM (e.g., point cloud models $WM_P$) in a plurality of orientations viewed from different virtual line-of-sight directions VL. For example, FIG. 7 illustrates the workpiece model WM in a first orientation when the workpiece model WM is viewed from the oblique virtual line-of-sight direction VL.

Figure 8:
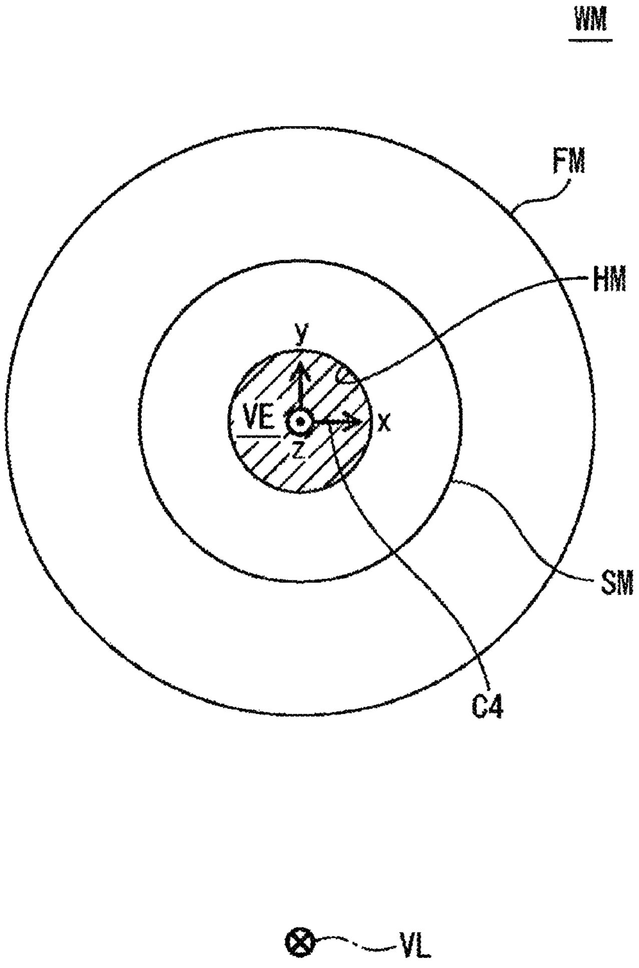
FIG. 8 illustrates a top view of the workpiece model illustrated in FIG. 8.

On the other hand, FIG. 8 illustrates the workpiece model WM in a second orientation when the workpiece model WM is viewed from a virtual line-of-sight direction VL parallel to a central axis line of the workpiece model WM. The processor 32 generates each of the workpiece models WM in various orientations when the workpiece model WM is viewed from various virtual line-of-sight directions VL, as illustrated in FIGS. 7 and 8.

Note that the plurality of generated workpiece models WM may have only model data on a front side visible when viewed from the virtual line-of-sight direction VL and need not have model data on a back side invisible when viewed from the virtual line-of-sight direction VL. For example, when generating the workpiece model WM in the first orientation illustrated in FIG. 7 as the point cloud model $WM_P$, the processor 32 generates model data of the point cloud of the model components on the front side of the page visible in FIG. 7, but does not generate model data of the point cloud of the model components on the back side of the page invisible in FIG. 7 (i.e., an edge, a surface, and the like on the back side when viewed from the virtual line-of-sight direction VL in FIG. 7). This configuration can reduce a data amount of the workpiece models WM to be generated.

A workpiece coordinate system C4 is set for each of the generated workpiece models WM. The workpiece coordinate system C4 is a control coordinate system that determines a position and orientation of the workpiece model WM. In the example illustrated in FIGS. 7 and 8, the workpiece coordinate system C4 is set with respect to the workpiece model WM such that the origin thereof is arranged at an opening center of the hole model HM opening at an end surface of the shaft portion model SM and the z axis thereof coincides with the central axis line of the hole model HM (or the workpiece model WM).

Note that the processor 32 may receive an input for setting the workpiece coordinate system C4 on the workpiece model WM from the operator through the input device 42. The processor 32 stores the generated workpiece models WM in the plurality of orientations in the memory 34 together with setting information on the workpiece coordinate system C4.

Here, a verification area VE is defined in advance in each of the generated workpiece models WM in the plurality of orientations. In the present embodiment, the hole model HM of the workpiece model WM (i.e., an area on a model corresponding to an area of the workpiece W where another workpiece W cannot enter) is defined as the verification area VE. Note that a method of setting the verification area VE in the workpiece model WM will be described below.

In step S12, the processor 32 performs a pre-process PP on the detection data DD acquired in step S1. For example, as the pre-process PP, the processor 32 may execute a process of deleting a point cloud to be invalidated (e.g., a point cloud present outside the container B or a point cloud greatly deviating from the point cloud of the shape data $SD_n$ of the workpiece $W_n$ by more than a predetermined distance) from the detection data DD among the point clouds included in the detection data DD.

In step S13, the processor 32 executes rough search RS. Specifically, as the rough search RS, the processor 32 sequentially arranges the workpiece models WM in the plurality of orientations generated in step S11 in a virtual space determined by the sensor coordinate system C3 of the detection data DD, and matches the workpiece models WM with the shape data $SD_n$ included in the detection data DD.

In this case, the processor 32 repeatedly displaces a position of the workpiece model WM arranged in the sensor coordinate system C3 by a predetermined displacement amount. Each time the position of the workpiece model WM is displaced, the processor 32 obtains a degree of coincidence α between a feature point Fm of the workpiece model WM and a feature point Fs of the shape data $SD_n$.

The degree of coincidence α includes an error in distance between, for example, the feature point Fm and the feature point Fs corresponding to the feature point Fm. In this case, the more the feature point Fm and the feature point Fs coincide with each other in the sensor coordinate system C3, the smaller the value of the degree of coincidence α is. Alternatively, the degree of coincidence α includes a degree of similarity representing similarity between the feature point Fm and the feature point Fs corresponding to the feature point FPm. In this case, the more the feature point Fm and the feature point Fs coincide with each other in the sensor coordinate system C3, the larger the value of the degree of coincidence α is.

Then, the processor 32 compares the obtained degree of coincidence α with a predetermined threshold value $\alpha_{th}$ with respect to the degree of coincidence α, and when the degree of coincidence α exceeds the threshold value $\alpha_{th}$ (i.e., $\alpha \leq \alpha_{th}$, or $\alpha \geq \alpha_{th}$), determines that the workpiece model WM and the shape data $SD_n$ are approximately matched in the sensor coordinate system C3.

Figure 9:
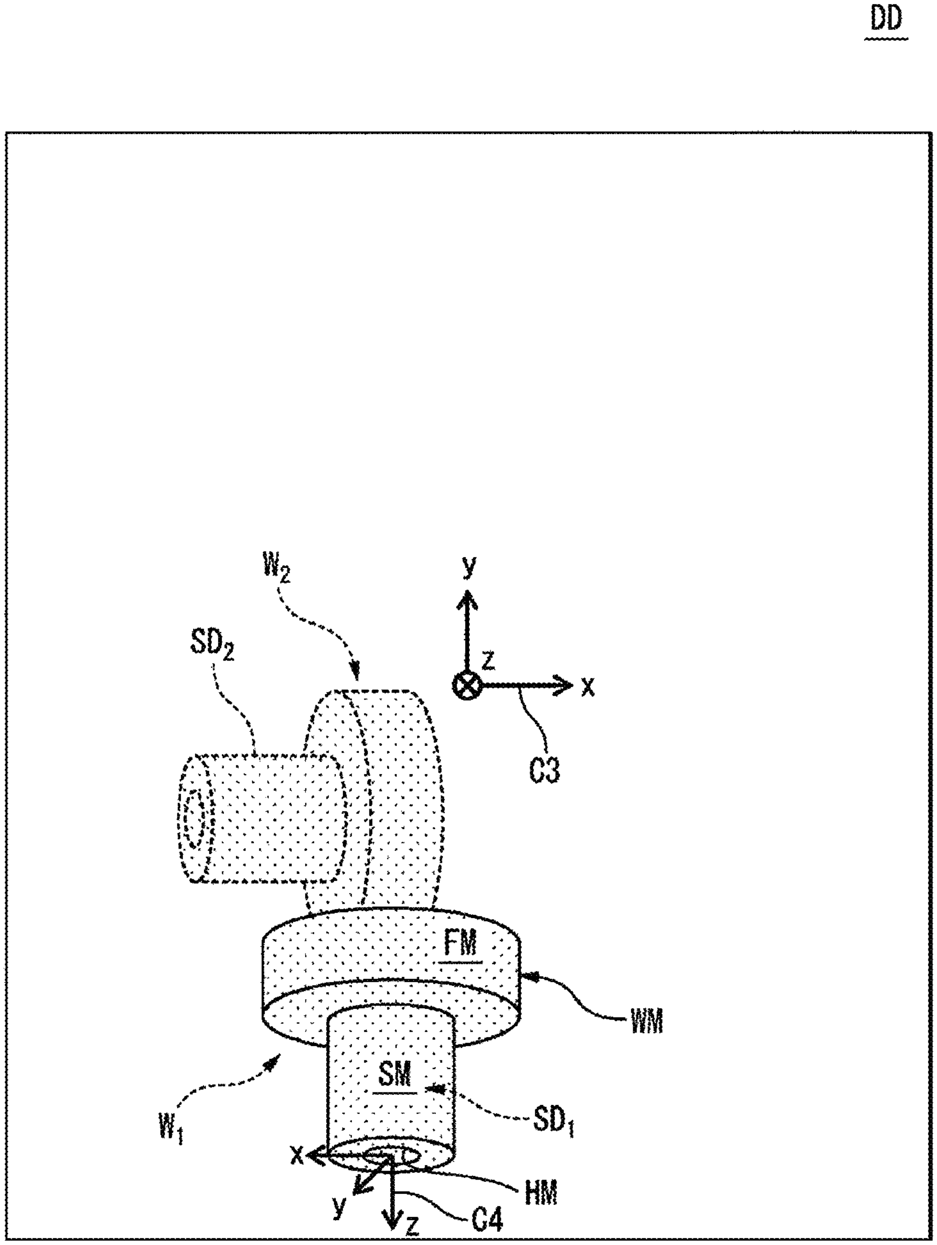
FIG. 9 illustrates a state in which a workpiece model is matched with the detection data illustrated in FIG. 5.

FIG. 9 illustrates a state in which the workpiece model WM is matched with the shape data $SD_1$ of the workpiece $W_1$. The processor 32 acquires coordinates $\mathbf{Q1}_S$ ($\mathbf{X1}_S$, $\mathbf{Y1}_S$, $\mathbf{Z1}_S$, $\mathbf{W1}_S$, $\mathbf{P1}_S$, and $\mathbf{R1}_S$) in the sensor coordinate system C3 of the workpiece coordinate system C4 set for the workpiece model WM matched with the shape data $SD_1$ as the rough search RS. In the coordinates $\mathbf{Q1}_S$, ($\mathbf{X1}_S$, $\mathbf{Y1}_S$, and $\mathbf{Z1}_S$) indicate an origin position of the workpiece coordinate system C4 in the sensor coordinate system C3, and ($\mathbf{W1}_S$, $\mathbf{P1}_S$, and $\mathbf{R1}_S$) indicate an orientation (so-called yaw, pitch, and roll) of the workpiece coordinate system C4 in the sensor coordinate system C3.

Then, the processor 32 converts the coordinates $\mathbf{Q1}_S$ in the sensor coordinate system C3 into coordinates $\mathbf{Q1}_R$ ($\mathbf{X1}_R$, $\mathbf{Y1}_R$, $\mathbf{Z1}_R$, $\mathbf{W1}_R$, $\mathbf{P1}_R$, and $\mathbf{R1}_R$) in the robot coordinate system C1, and acquires the coordinates $\mathbf{Q1}_R$ as initial position data $PD_{1\_1}$. The initial position data $PD_{1\_1}$ represents an approximate value of the position and orientation of the workpiece $W_1$ in the robot coordinate system C1.

Similarly, the processor 32 acquires initial position data $PD_{1\_n}$ of another workpiece $W_n$ imaged in the detection data DD. If the shape data $SD_1$ of the workpiece $W_1$, the shape data $SD_2$ of the workpiece $W_2$, . . . , and the shape data $SD_n$ of the workpiece $W_n$ (n is a positive integer) are included in the detection data DD, the processor 32 acquires the initial position data $PD_{1\_1}$ of the workpiece $W_1$, the initial position data $PD_{1\_2}$ of the workpiece $W_2$, . . . , and the initial position data $PD_{1\_n}$ of the workpiece $W_n$. In this way, the processor 32 acquires the position data $PD_{1\_n}$ of the workpiece $W_n$ by matching the workpiece model WM with the shape data $SD_n$ in the rough search RS.

In step S14, the processor 32 executes precise search PR. Specifically, with respect to the workpiece $W_n$ imaged in the detection data DD, the processor 32 uses the initial position data $PD_{1\_n}$ acquired in step S13 as a reference and searches for a position where the workpiece model WM highly matches the shape data $SD_n$ in the sensor coordinate system C3 in accordance with a predetermined matching algorithm (e.g., a mathematical optimization algorithm such as Iterative Closest Point: ICP).

For example, the processor 32 obtains a degree of coincidence β between the point cloud of the point cloud model $WM_P$ arranged as the workpiece model WM in the initial position data $PD_{1\_n}$ of the sensor coordinate system C3 and the three-dimensional point cloud of the shape data $SD_n$ included in the detection data DD. For example, this degree of coincidence β includes an error in distance between the point cloud of the point cloud model $WM_P$ and the three-dimensional point cloud of the shape data $SD_n$, or a degree of similarity between the point cloud of the point cloud model $WM_P$ and the three-dimensional point cloud of the shape data $SD_n$.

Then, the processor 32 compares the obtained degree of coincidence β with a predetermined threshold value $\beta_{th}$ with respect to the degree of coincidence β, and when the degree of coincidence β exceeds the threshold value $\beta_{th}$ (i.e., $\beta \leq \beta_{th}$, or $\beta \geq \beta_{th}$), determines that the workpiece model WM (e.g., the point cloud model $WM_P$) and the shape data $SD_n$ are highly matched in the sensor coordinate system C3. On the other hand, when the degree of coincidence β does not exceed the threshold value $\beta_{th}$, the processor 32 displaces the position of the workpiece model WM arranged in the sensor coordinate system C3 by a predetermined displacement amount, obtains the degree of coincidence β each time the position of the workpiece model WM is displaced, and compares the degree of coincidence β with the threshold value $\beta_{th}$.

When the degree of coincidence β exceeds the threshold value $\beta_{th}$, the processor 32 acquires coordinates $\mathbf{Q2}_S$ ($\mathbf{X2}_S$, $\mathbf{Y2}_S$, $\mathbf{Z2}_S$, $\mathbf{W2}_S$, $\mathbf{P2}_S$, and $\mathbf{R2}_S$) in the sensor coordinate system C3 of the workpiece coordinate system C4 set for the workpiece model WM highly matched with the shape data $SD_n$ as the precise search PR.

Then, the processor 32 converts the coordinates $\mathbf{Q2}_S$ in the sensor coordinate system C3 into coordinates $\mathbf{Q2}_R$ ($\mathbf{X2}_R$, $\mathbf{Y2}_R$, $\mathbf{Z2}_R$, $\mathbf{W2}_R$, $\mathbf{P2}_R$, and $\mathbf{R2}_R$) in the robot coordinate system C1, and acquires the coordinates $\mathbf{Q2}_R$ as position data $PD_{2\_n}$ of the workpiece $W_n$. The position data $PD_{2\_n}$ represents a highly accurate position and orientation of the workpiece $W_n$ in the robot coordinate system C1.

As a result of step S14, the processor 32 acquires the position data $PD_{2\_n}$ of each of the plurality of workpieces $W_n$ imaged in the detection data DD. The processor 32 stores the acquired position data $PD_{2\_n}$ in the memory 34, as detection result data DT. An example of a data structure of the detection result data DT is schematically shown in Table 1 below.

TABLE 1

| Workpiece | Position Data | Degree of coincidence | Plane ratio | Exposure ratio |
|---|---|---|---|---|
| $W_1$ | $PD_{2\_1}$ | $\beta_1$ | $\gamma_1$ | $\delta_1$ |
| $W_2$ | $PD_{2\_2}$ | $\beta_2$ | $\gamma_2$ | $\delta_2$ |
| . | . | . | . | . |
| . | . | . | . | . |
| . | . | . | . | . |
| $W_n$ | $PD_{2\_n}$ | $\beta_n$ | $\gamma_n$ | $\delta_n$ |

Table 1

The position data $PD_{2\_n}$ of the workpiece $W_n$ (specifically, the coordinates $Q2_S$ ($X2_R$, $Y2_R$, $Z2_R$, $W2_R$, $P2_R$, and $R2_R$)) and detection result parameters PM such as the degree of coincidence Bn, the plane ratio $\gamma_n$, and the exposure ratio on are stored in the detection result data DT shown in Table 1. The detection result parameter PM is a parameter representing a result of matching between the shape data $SD_n$ of the workpiece $W_n$ and the workpiece model WM executed at the time of acquisition of the position data $PD_{2\_n}$. Specifically, the degree of coincidence Bn is a degree of coincidence when it is determined that the workpiece model WM is highly matched with the shape data $SD_n$ in the precise search PR of step S14.

For example, in the workpiece model WM matched with the shape data $SD_n$ in the precise search PR, the plane ratio $\gamma_n$ is a ratio of the maximum plane model (specifically, the point cloud model $WM_P$ of the plane) included in the workpiece model WM to the entire workpiece model WM (specifically, the entire point cloud model $WM_P$). Alternatively, the plane ratio $\gamma_n$ may be a ratio of a point cloud representing the maximum plane included in the shape data $SD_n$ with which the workpiece model WM is matched in the precise search PR to the entire shape data $SD_n$ (specifically, the entire point cloud).

The exposure ratio $\delta_n$ represents, for example, a ratio of an area of the workpiece model WM matched with the shape data $SD_n$ (i.e., a point cloud of the point cloud model $WM_P$ matched with the point cloud of the shape data $SD_n$) to the entire workpiece model WM matched with the shape data $SD_n$ in the precise search PR (specifically, all point clouds constituting the point cloud model $WM_P$).

The processor 32 acquires the detection result parameters PM (the degree of coincidence $\beta_n$, the plane ratio $\gamma_n$, and the exposure ratio $\delta_n$) together with the position data $PD_{2\_n}$ and stores the detection result parameters PM in the memory 34 as the detection result data DT, in association with the position data $PD_{2\_n}$. Note that the detection result parameter PM is not limited to the degree of coincidence $\beta_n$, the plane ratio $\gamma_n$, and the exposure ratio $\delta_n$, and may include any other parameter.

In step S15, the processor 32 executes a post-process OP on the detection result data DT. For example, as the post-process OP, the processor 32 may execute a process of deleting the position data $PD_{2\_n}$ whose detection result parameter PM does not satisfy a predetermined reference from the detection result data DT.

Specifically, when the degree of coincidence $\beta_n$, the plane ratio $\gamma_n$, or the exposure ratio on does not exceed a predetermined reference value, the processor 32 may determine that the detection result parameter PM does not satisfy the reference, and delete the position data $PD_{2\_n}$ associated with the detection result parameter PM from the detection result data DT. In this way, the processor 32 functions as the position data acquiring unit 44, executes step S2 illustrated in FIG. 6, and acquires the position data $PD_{1\_n}$ and $PD_{2\_n}$ of the workpiece $W_n$.

Referring to FIG. 4 again, in step S3, the processor 32 verifies mismatch between the workpiece model WM and the shape data $SD_n$. Here, when the workpiece model WM is matched with the shape data $SD_n$ in steps S13 and S14 described above, the processor 32 may erroneously match the workpiece model WM with the shape data $SD_n$, and accordingly mismatch may occur between the matched workpiece model WM and shape data $SD_n$.

Figure 10:
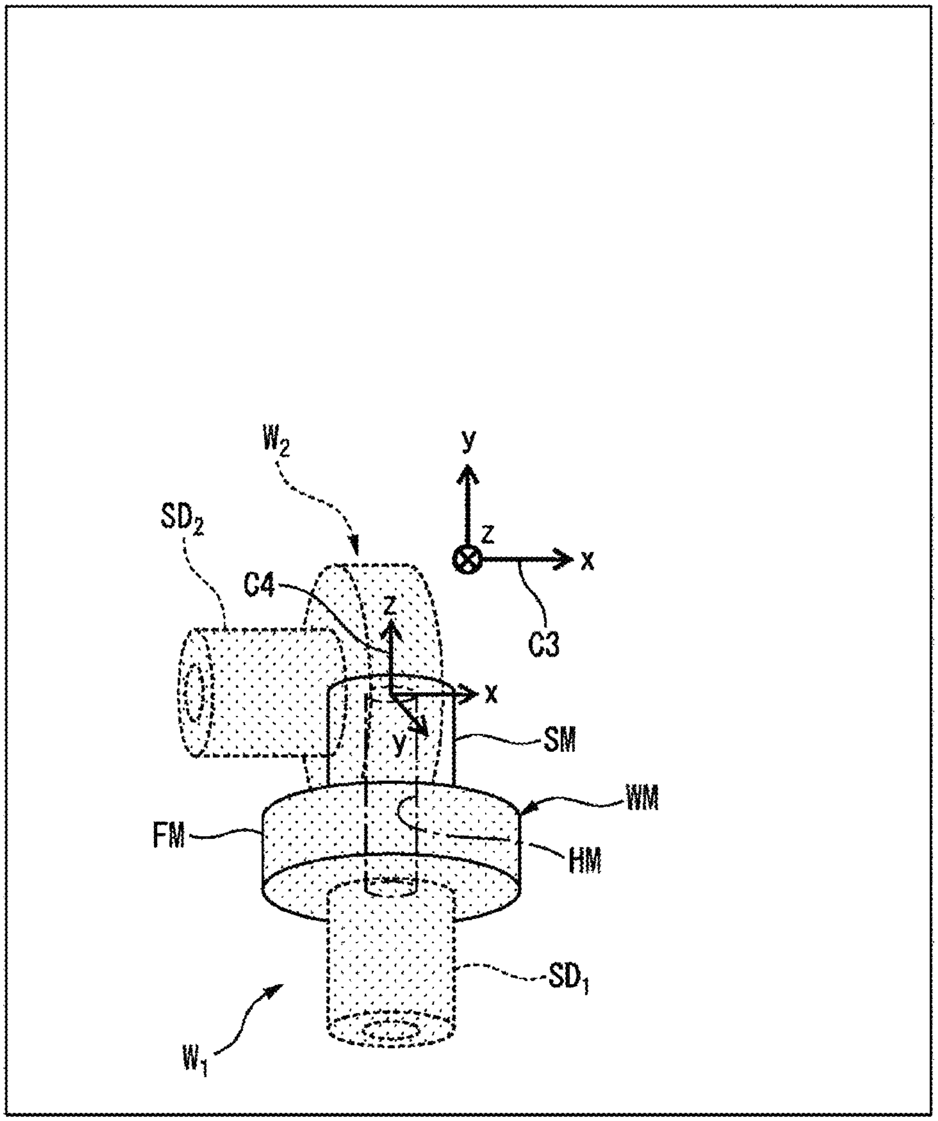
FIG. 10 illustrates a state in which a workpiece model is erroneously matched with the detection data illustrated in FIG. 5.

FIG. 10 illustrates an example of a state in which such mismatch occurs. In the example illustrated in FIG. 10, when the processor 32 matches the workpiece model WM with the shape data $SD_1$ of the workpiece $W_1$ imaged in the detection data DD, the flange portion model FM of the workpiece model WM matches the shape data $SD_1$ of the flange portion F in the shape data $SD_1$ of the workpiece $W_1$.

On the other hand, the shaft portion model SM of the workpiece model WM does not match the shape data $SD_1$ of the shaft portion S of the workpiece $W_1$. As a result, a part of the point cloud of the shape data $SD_2$ of another workpiece $W_2$ is present in the hole model HM of the workpiece model WM set as the verification area VE described above.

In the present embodiment, in step S3, the processor 32 verifies whether or not mismatch as illustrated in FIG. 10 has occurred based on the shape data $SD_2$ of the workpiece $W_2$ present in the verification area VE, and invalidates the position data $PD_{2\_n}$ acquired as the detection result data DT when mismatch has occurred. That is, in the present embodiment, the processor 32 functions as a position data canceling unit 46 (FIG. 2) configured to invalidate the position data $PD_{2\_n}$.

Figure 11:
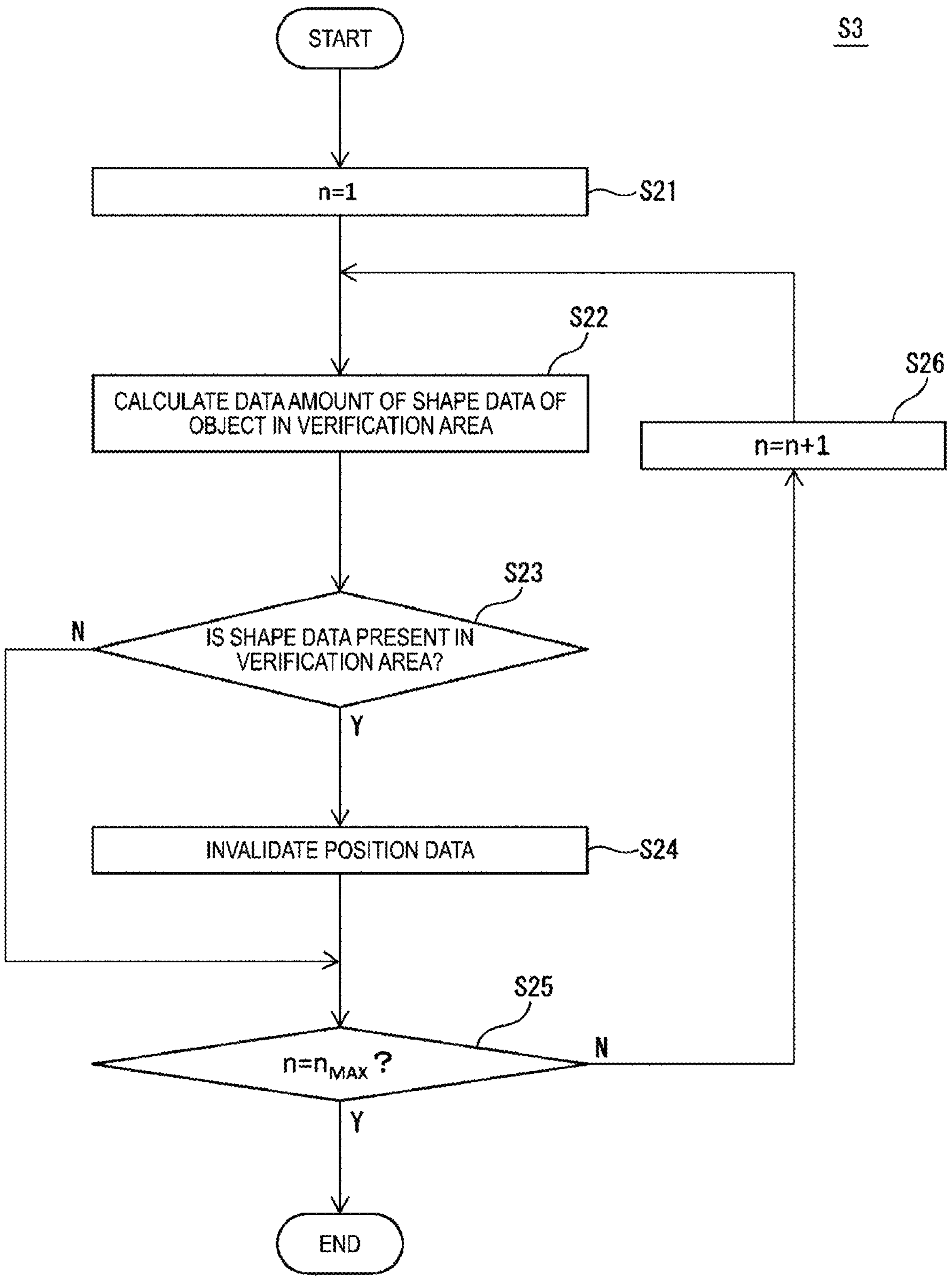
FIG. 11 is a flowchart illustrating an example of the flow of step S3 in FIG. 4.

Below, step S3 will be described with reference to FIG. 11. The processor 32 functions as the position data canceling unit 46 and executes the flow of step S3 illustrated in FIG. 11. After the start of step S3, in step S21, the processor 32 sets the number "n" for specifying the position data $PD_{2\_n}$ of the workpiece $W_n$ stored in the detection result data DT to "1".

In step S22, the processor 32 calculates a data amount $DA_n$ of the shape data $SD_m$ (e.g., m Æn) in the verification area VE defined in the workpiece model WM matched at the time of acquiring the position data $PD_{2\_n}$ of the workpiece $W_n$. If the number "n" is set to 1 (n=1) at the start of step S22 (i.e., when step S22 is executed for the first time), the processor 32 calculates a data amount $DA_1$ of the shape data $SD_m$ in the verification area VE defined in the workpiece model WM matched at the time of acquiring the position data $PD_{2\_1}$ of the workpiece $W_1$.

For example, in the case of the example illustrated in FIG. 10, as described above, the point cloud of the shape data $SD_2$ of the workpiece $W_2$ as an object adjacent to the workpiece $W_1$ is present in the verification area VE of the workpiece model WM erroneously matched with the shape data $SD_1$ of the workpiece $W_1$. Therefore, in this case, the processor 32 calculates the data amount $DA_1$ of the point cloud of the shape data $SD_2$ in the verification area VE defined in the workpiece model WM.

Specifically, the processor 32 calculates the number of points of the shape data $SD_2$ arranged in the verification area VE in the sensor coordinate system C3, as the data amount $DA_1$. In this way, in step S22, the processor 32 calculates the data amount $DA_n$ of the shape data $SD_m$ in the verification area VE defined in the workpiece model WM matched at the time of acquiring the position data $PD_{2\_n}$ of the workpiece $W_n$.

In step S23, the processor 32 determines whether or not the shape data $SD_m$ is present in the verification area VE of the workpiece model WM matched at the time of acquiring the position data $PD_{2\_n}$ of the workpiece $W_n$, based on the data amount $DA_n$ calculated in the immediately preceding step S22. Specifically, the processor 32 calculates a mismatch parameter En by substituting the data amount $DA_n$ calculated in the immediately preceding step S22 and a data amount $DA_w$ of the workpiece model WM into the following Formula 1.

$$\varepsilon_n = DA_n / DA_w \quad \text{(Formula 1)}$$

The mismatch parameter En obtained by calculation of Formula 1 is a parameter quantitatively representing a degree of mismatch between the workpiece model WM and the shape data $SD_n$. As described above, the verification area VE is defined in the workpiece model WM so as to correspond to an area where another object (e.g., the workpiece $W_2$) cannot enter. Therefore, for example, as illustrated in FIG. 9, when the workpiece model WM is appropriately matched with the shape data $SD_1$ of the workpiece $W_1$, a point cloud of the shape data $SD_2$ of the workpiece $W_2$ as another object adjacent to the workpiece $W_1$ is not substantially present in the verification area VE of the workpiece model WM.

On the other hand, as illustrated in FIG. 10, when the workpiece model WM is erroneously matched with the shape data $SD_1$, a point cloud of the shape data $SD_2$ is present in the verification area VE of the workpiece model WM. Therefore, by obtaining the mismatch parameter Ei from the data amount $DA_1$ of the shape data $SD_2$ in the verification area VE and Formula 1 described above, it is possible to quantitatively verify the mismatch between the workpiece model WM and the shape data $SD_1$ of the workpiece $W_1$ as illustrated in FIG. 10.

In step S23, the processor 32 determines whether or not the mismatch parameter En obtained as described above is equal to or greater than a predetermined threshold value $\varepsilon_{th}$ (i.e., $\varepsilon_n \geq$Eth). If $\varepsilon_n \geq \varepsilon_{th}$, the processor 32 determines that the shape data $SD_m$ is present in the verification area VE (i.e., determines YES). On the other hand, if $\varepsilon_n < \varepsilon_{th}$, the processor 32 determines NO.

Note that Formula 1 described above can be modified to Formula of $\varepsilon_n = DA_n / DA_w \times 100$. In addition, the mismatch parameter quantitatively representing the degree of mismatch between the workpiece model WM and the shape data $SD_n$ may be obtained by any calculation using the data amount $DA_n$ without being limited to the calculation of Formula 1 described above.

Alternatively, the processor 32 may determine YES when the data amount $DA_n$ calculated in the immediately preceding step S22 is equal to or greater than a predetermined threshold value $DA_{th}$ (i.e., $DA_n \geq DA_{th}$) without obtaining the mismatch parameter $\varepsilon_n$. The processor 32 proceeds to step S24 upon determining YES, and proceeds to step S25 upon determining NO.

In step S24, the processor 32 functions as the position data canceling unit 46 and invalidates the position data PD of the workpiece W acquired in step S2 described above. A description below is given assuming a case where "n" is set to 1 (n=1) at the start of step S24.

When the workpiece model WM is erroneously matched with the shape data $SD_1$ as illustrated in FIG. 10, the workpiece coordinate system C4 set for the workpiece model WM does not accurately represent the position and orientation of the workpiece $W_1$ imaged in the detection data DD. Therefore, if the processor 32 causes the robot 12 to perform work on the workpiece $W_1$ using the position data $PD_{2\_1}$ acquired based on the workpiece coordinate system C4 of such mismatch in step S5 described below, the work cannot be performed with high accuracy.

Therefore, in the present embodiment, the processor 32 functions as the position data canceling unit 46 in step S24, and invalidates the position data $PD_{2\_1}$ so as to avoid using the position data $PD_{2\_1}$ acquired as a result of the mismatch in control of step S5 described below.

As an example, the processor 32 deletes the position data $PD_{2\_1}$ of the workpiece $W_1$ from the detection result data DT created in step S2 described above. As another example, the processor 32 adds an invalid flag FL to the position data $PD_{2\_1}$ of the workpiece $W_1$ stored in the detection result data DT.

In this case, the processor 32 refers to the invalid flag FL assigned to the position data $PD_{2\_1}$ and ignores the position data $PD_{2\_1}$ when the position data $PD_{2\_1}$ of the detection result data DT is read out at the time of executing step S5 described below. As a result, the processor 32 cancels work on the workpiece $W_1$ in step S5.

In this way, the processor 32 invalidates the position data $PD_{2\_n}$ stored in the detection result data DT in step S24 (e.g., deletes the position data or adds the invalid flag FL to the position data), thereby making it possible to avoid using the position data $PD_{2\_1}$ acquired as a result of the mismatch in control of step S5 described below.

In step S25, the processor 32 determines whether or not the number "n" set at this time point is equal to $n_{MAX}$ ($n=n_{MAX}$). $n_{MAX}$ is a total number of the position data $PD_{2\_n}$ of the workpiece $W_n$ acquired in step S2 (or a total number of the workpieces $W_n$ imaged in the detection data DD acquired in the most recent step S1). The processor 32 ends the flow illustrated in FIG. 11 upon determining YES and returns to step S26 upon determining NO.

In step S26, the processor 32 increments the number "n" by "1" (n=n+1). Then, the processor 32 returns to step S22. In this way, the processor 32 repeatedly executes the loop of steps S22 to S26 and invalidates the position data $PD_{2\_n}$ acquired as a result of the mismatch among the position data $PD_{2\_n}$ stored in the detection result data DT, until determining YES in step S25.

Referring to FIG. 4 again, in step S4, the processor 32 determines the position data $PD_{2\_n}$. Specifically, the processor 32 determines the detection result data DT after the execution of the above-described step S3 as formal control data used for control of step S5 described below, and stores the detection result data in the memory 34 (e.g., a RAM).

In step S5, the processor 32 refers to the detection result data DT determined in step S4, and operates the robot 12 to perform work (workpiece handling, welding, laser process, or the like) on the workpiece $W_n$. It is assumed that the position data $PD_{2\_1}$ of the workpiece $W_1$ is invalidated but the position data $PD_{2\_2}$ of the workpiece $W_2$ is not invalidated in step S24 described above.

In this case, while canceling the work on the workpiece $W_1$, the processor 32 refers to the position data $PD_{2\_2}$ of the workpiece $W_2$ stored in the detection result data DT, operates the robot 12 to determine the end effector 28 (i.e., the origin of the tool coordinate system C2) to be at the position and orientation indicated by the position data $PD_{2\_2}$ (i.e., the coordinates $Q2_R$ of the robot coordinate system C1 ($X2_R$, $Y2_R$, $Z2_R$, $W2_R$, $P2_R$, and $R2_R$)), and performs work on the workpiece $W_2$ by the end effector 28.

In step S6, the processor 32 determines whether or not the work on all of the workpieces W in the container B has been completed. The processor 32 ends the flow illustrated in FIG. 4 upon determining YES and returns to step S1 upon determining NO. In this way, the processor 32 repeatedly executes the loop of steps S1 to S6, acquires the detection data DD newly detected by the shape detection sensor 14 in step S1, and executes steps S2 to S5 based on the new detection data DD, until determining YES in step S6.

As described above, in the present embodiment, the processor 32 functions as the position data acquiring unit 44 and the position data canceling unit 46 and acquires the position data $PD_{1\_n}$ and $PD_{2\_n}$ of the workpiece $W_n$ based on the detection data DD of the shape detection sensor 14. Therefore, the position data acquiring unit 44 and the position data canceling unit 46 constitute a device 50 (FIG. 2) configured to acquire the position data $PD_{1\_n}$ and $PD_{2\_n}$ of the workpiece $W_n$ based on the detection data DD of the shape detection sensor 14.

In the device 50, the position data acquiring unit 44 acquires the position data $PD_{1\_n}$ and $PD_{2\_n}$ of the workpiece $W_n$ by matching the workpiece model WM in which the verification area VE corresponding to an area where an object (e.g., another workpiece $W_2$) cannot enter is defined with the shape data $SD_n$ of the workpiece $W_n$ included in the detection data DD (steps S13 and S14).

When the shape data $SD_m$ of the object included in the detection data DD (e.g., the shape data $SD_2$ of the workpiece $W_2$ in FIG. 10) is present in the verification area VE defined in the workpiece model matched with the shape data $SD_n$ of the workpiece $W_n$ (when determined as YES in step S23), the position data acquiring unit 44 invalidates the position data $PD_{2\_n}$ acquired by the position data acquiring unit 44 (step S24).

According to this configuration, it is possible to avoid causing the robot 12 to perform the work (step S5) on the workpiece $W_n$ using the position data $PD_{2\_n}$ acquired as a result of the mismatch as illustrated in FIG. 10. As a result, accuracy of work by the robot 12 can be improved.

In addition, in the device 50, the position data canceling unit 46 calculates the data amount $DA_n$ of the shape data $SD_m$ of the object in the verification area VE defined in the workpiece model WM matched with the shape data $SD_n$ (step S22), and determines whether or not the shape data $SD_m$ is present in the verification area VE based on the calculated data amount $DA_n$ (step S23). According to this configuration, it is possible to quantitatively verify the mismatch between the workpiece model WM and the shape data $SD_n$ by the data amount $DA_n$ that cannot be present in the verification area VE when appropriate matching is performed. As a result, the presence or absence of the mismatch can be effectively detected.

In addition, in the device 50, the position data canceling unit 46 determines whether or not the shape data $SD_m$ of the object is present in the verification area VE by performing a predetermined calculation (specifically, the calculation of Formula 1 described above) using the data amount $DA_n$ calculated in step S22 and the data amount $DA_w$ of the workpiece model WM (step S23).

According to this configuration, it is possible to obtain the parameter (e.g., the mismatch parameter $\varepsilon_n$ or the data amount $DA_n$) quantitatively representing the degree of mismatch between the workpiece model WM and the shape data $SD_n$ by the predetermined calculation (calculation of Formula 1) and verify the mismatch by the parameter. Therefore, the presence or absence of the mismatch can be detected with higher accuracy.

Next, another aspect of step S3 in FIG. 4 will be described with reference to FIG. 12. In step S3 illustrated in FIG. 12, after step S21 or S26, in step S31, the processor 32 determines whether or not to calculate the data amount $DA_n$ in step S22 for the position data $PD_{2\_n}$ of the workpiece $W_n$.

As an example, the processor 32 determines whether or not it is necessary to calculate the data amount $DA_n$ in step S22, based on the detection result parameter PM associated with the position data $PD_{2\_n}$ of the workpiece $W_n$. Here, the detection result parameter PM when the position data $PD_{2\_n}$ is acquired has correlativity with a probability of occurrence of the mismatch described above. Specifically, when the degree of coincidence $\beta_n$, the plane ratio $\gamma_n$, or the exposure ratio on is high, the probability of occurrence of the mismatch may decrease. On the other hand, when the degree of coincidence $\beta_n$, the plane ratio $\gamma_n$, or the exposure ratio on is significantly low, the probability of occurrence of the mismatch may increase.

Therefore, when the degree of coincidence $\beta_n$, the plane ratio $\gamma_n$, or the exposure ratio on stored in the detection result data DT in association with the position data $PD_{2\_n}$ exceeds a predetermined threshold value, in step S31, the processor 32 determines that it is not necessary to execute the subsequent step S22 to calculate the data amount $DA_n$ (i.e., determines NO). On the other hand, when the degree of coincidence $\beta_n$, the plane ratio $\gamma_n$, or the exposure ratio $\delta_n$ does not exceed the predetermined threshold value, the processor 32 determines that it is necessary to execute the subsequent step S22 to calculate the data amount $DA_n$ (i.e., determines YES).

As another example, in step S31, the processor 32 determines whether or not it is necessary to calculate the data amount $DA_n$ in step S22, based on at least one of the position and the orientation of the workpiece model WM matched at the time of acquisition of the position data $PD_{2\_n}$ of the workpiece $W_n$. Here, the probability of occurrence of the mismatch may vary depending on the position or orientation of the workpiece model WM matched with the shape data $SD_n$ of the workpiece $W_n$ imaged in the detection data DD.

For example, when the workpiece model WM is matched with the shape data $SD_n$ located at a position close to the shape data of the container A (i.e., the point cloud indicating the visual feature of the container A) in the detection data DD, the probability of occurrence of the mismatch may increase. Alternatively, when the workpiece model WM is matched with the shape data $SD_n$ located at a position (i.e., a position closer to a bottom surface of the container A) farther in the positive direction of the z axis of the sensor coordinate system C3 (or the negative direction of the z axis of the robot coordinate system C1) in the detection data DD, the probability of occurrence of the mismatch may increase.

Therefore, in the present embodiment, when the position data $PD_{2\_n}$ (i.e., the coordinates $Q2_R$ ($X2_R$, $Y2_R$, $Z2_R$, $W2_R$, $P2_R$, and $R2_R$)) are within a predetermined coordinate range QR, the processor 32 determines that it is necessary to execute the subsequent step S22 to calculate the data amount $DA_n$ (i.e., determines YES). As an example, the coordinate range QR can be defined as a range of a predetermined distance from the coordinates of the shape data of the container A included in the detection data DD in the robot coordinate system C1.

As another example, the coordinate range QR may be defined as a range of $Z2_R \leq Z_{th}$ with respect to a z coordinate: $Z2_R$ among the acquired position data $PD_{2\_n}$: coordinates $Q2_R$ ($X2_R$, $Y2_R$, $Z2_R$, $W2_R$, $P2_R$, and $R2_R$). The threshold value $Z_{th}$ demarcating the coordinate range QR may be defined, for example, as coordinates separated by a predetermined distance in the negative direction of the z axis of the robot coordinate system C1 from a point located at an end in the positive direction of the z axis of the robot coordinate system C1 among the point cloud of the shape data $SD_n$ of the workpiece $W_n$ included in the detection data DD.

When the coordinates $Q2_R$ ($X2_R$, $Y2_R$, $Z2_R$, $W2_R$, $P2_R$, and $R2_R$) of the position data $PD_{2\_n}$ are within the coordinate range QR, the processor 32 determines that it is necessary to execute the subsequent step S22 to calculate the data amount $DA_n$ (i.e., determines YES).

In addition, when the workpiece model WM in a first orientation illustrated in FIG. 7 is matched, the probability of occurrence of the mismatch can decrease, whereas when the workpiece model WM in a second orientation illustrated in FIG. 8 is matched, the probability of occurrence of the mismatch can increase. Therefore, in the present embodiment, when the orientation of the workpiece model WM matched at the time of acquisition of the position data $PD_{2\_n}$ is a predetermined reference orientation (e.g., the second orientation in FIG. 8), the processor 32 determines that it is necessary to execute the subsequent step S22 to calculate the data amount $DA_n$ (i.e., determines YES).

On the other hand, when the orientation of the matched workpiece model WM is not the reference orientation, the processor 32 determines that it is not necessary to execute the subsequent step S22 to calculate the data amount $DA_n$ (i.e., determines NO). In this way, in step S31, the processor 32 determines whether or not to calculate the data amount $DA_n$, based on the detection result parameter PM indicating a result of the matching or the orientation of the matched workpiece model WM.

The processor 32 proceeds to step S22 upon determining YES, and proceeds to step S32 upon determining NO. Note that, in step S31, the processor 50 may determine whether or not the coordinates $Q2_R$ of the position data $PD_{2\_n}$ are within the coordinate range QR, and whether or not the orientation of the matched workpiece model WM is the reference orientation. When the coordinates $Q2_R$ are in the coordinate range QR and the orientation of the workpiece model WM is the reference orientation, the processor 50 may determine YES.

Figure 13:
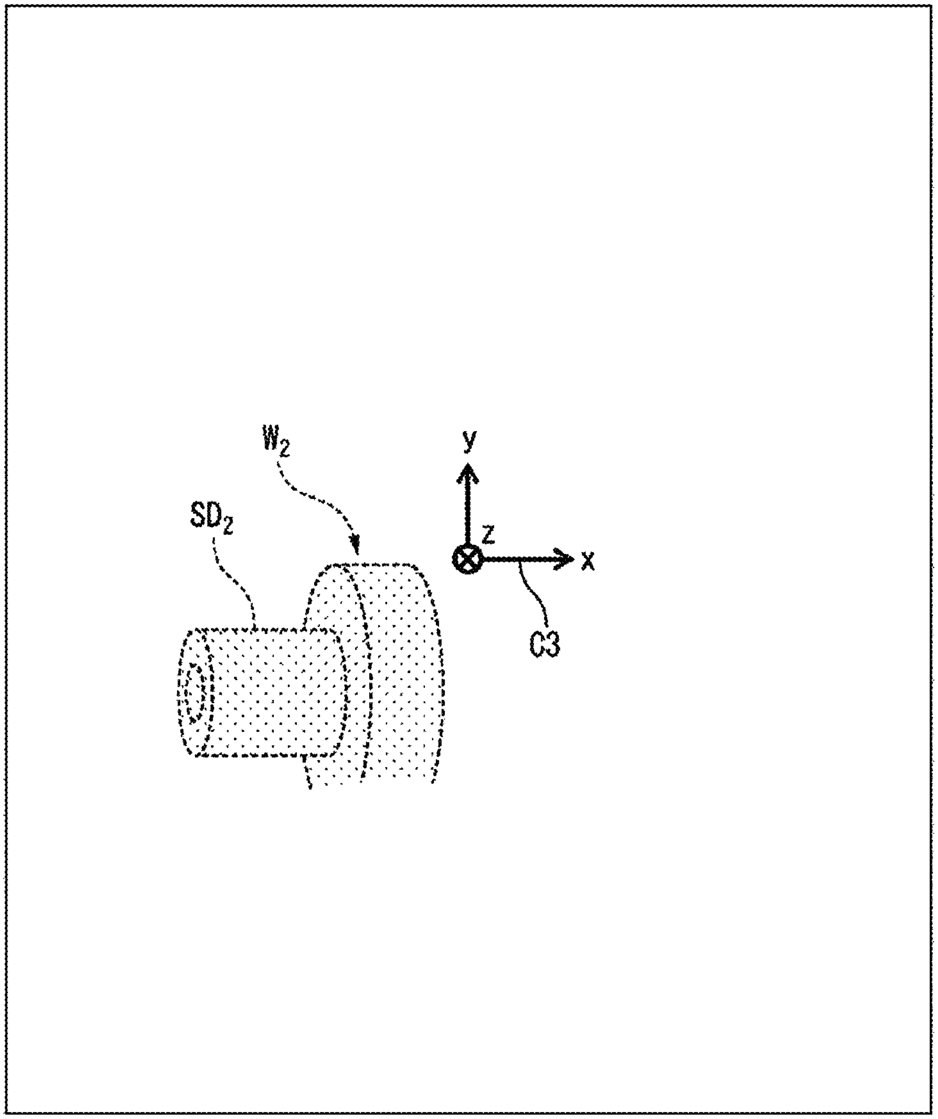
FIG. 13 illustrates a state in which one piece of shape data is deleted from the detection data illustrated in FIG. 5.

When the processor 32 determines NO in step S31 or S23, the processor deletes the shape data $SD_n$ of the workpiece $W_n$ from the detection data DD in step S32. It is assumed that the above-described number "n" is set to 1 (n=1) and the position data $PD_{2\_1}$ of the workpiece $W_1$ is determined to be NO in step S31 or S23. In this case, the processor 32 deletes the point cloud of the shape data $SD_1$ of the workpiece $W_1$ from the detection data DD illustrated in FIG. 9 acquired in the most recent step S1. FIG. 13 schematically shows the detection data DD from which the shape data $SD_1$ has been deleted in this manner.

Thereafter, the processor 32 increments the number "n" to "2" in step S26, and executes steps S31 and S22 to S24 for the position data $PD_{2\_2}$ of the next workpiece $W_2$. It is assumed that the position data $PD_{2\_2}$ of the workpiece $W_2$ is determined to be YES in step S31 and steps S22 and S23 are executed.

In this case, the processor 32 executes step S22 based on the detection data DD from which the shape data $SD_1$ has been deleted as illustrated in FIG. 13, and calculates a data amount $DA_2$ of the shape data $SD_m$ of another workpiece $W_m$ (not illustrated) adjacent to the workpiece $W_2$ in the verification area VE defined in the workpiece model WM matched at the time of acquisition of the position data $PD_{2\_2}$ of the workpiece $W_2$. Next, in step S23, the processor 32 determines whether or not the shape data $SD_m$ of the workpiece $W_m$ is present in the verification area VE of the workpiece model WM matched at the time of acquiring the position data $PD_{2\_2}$ of the workpiece $W_2$, based on the data amount $DA_2$.

As described above, in the aspect illustrated in FIG. 12, the position data canceling unit 46 determines whether or not to calculate the data amount $DA_n$, based on the detection result parameter PM or the orientation of the matched workpiece model WM (step S31). According to this configuration, since steps S22 to S24 can be omitted for the position data $PD_{2\_n}$ estimated to have a low probability of occurrence of the above-described mismatch, the cycle time of step S3 can be reduced.

Figure 12:
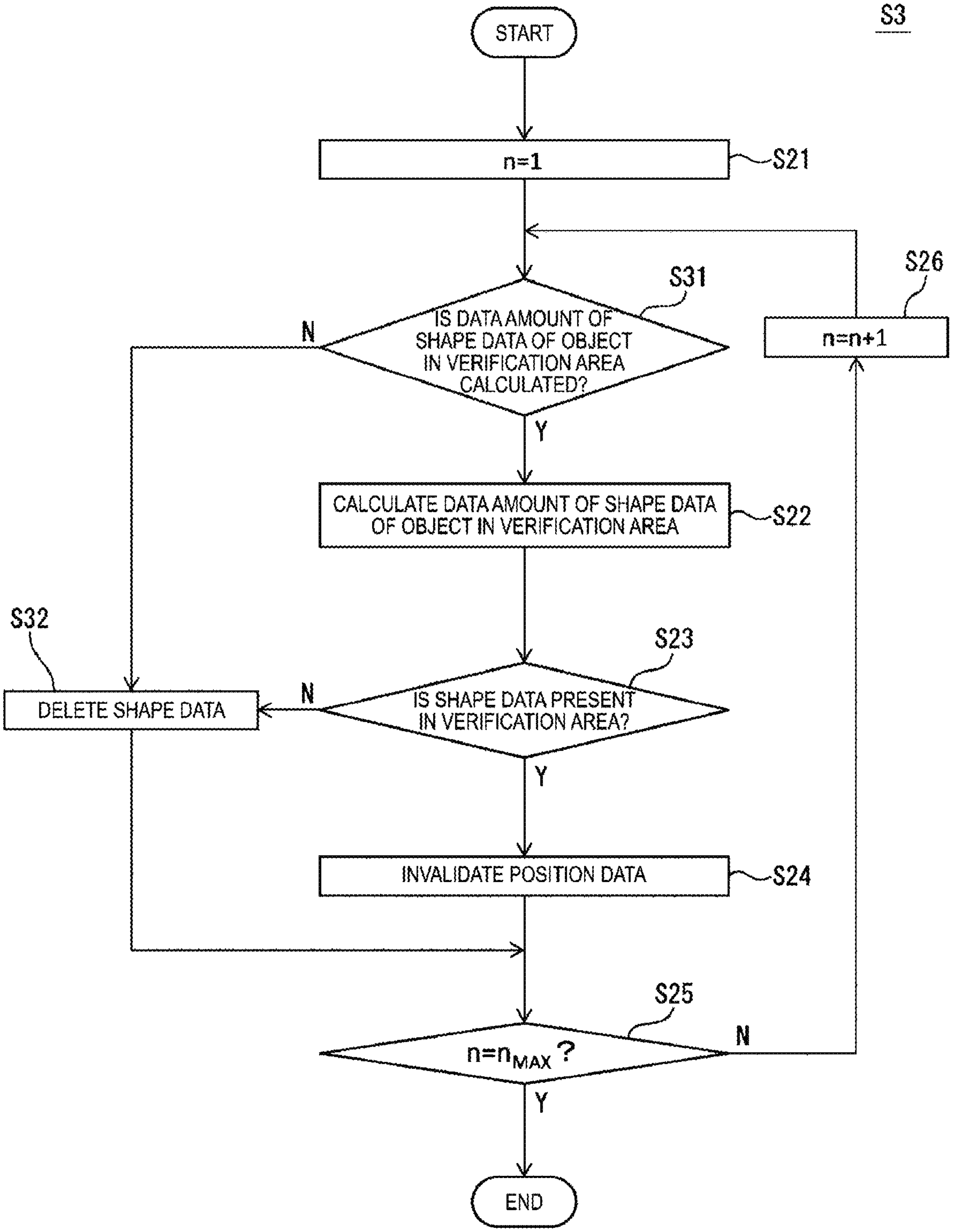
FIG. 12 is a flowchart illustrating another example of the flow of step S3 in FIG. 4.

In addition, in the embodiment illustrated in FIG. 12, the position data acquiring unit 44 acquires the position data $PD_{1\_1}$ and $PD_{2\_1}$ of the workpiece $W_1$ by matching the workpiece model WM with the shape data $SD_1$ of the workpiece $W_1$ (third workpiece) included in the detection data DD and different from the workpiece $W_2$ (step S1), and the position data canceling unit 46 deletes the shape data $SD_1$ of the workpiece $W_1$ from the detection data DD after the position data acquiring unit 44 acquires the position data $PD_{1\_1}$ and $PD_{2\_1}$ of the workpiece $W_1$ (step S32).

Then, the position data canceling unit 46 determines whether or not the shape data $SD_m$ of the object (e.g., another workpiece $W_m$) included in the detection data DD from which the shape data $SD_1$ of the workpiece $W_1$ has been deleted is present in the verification area VE defined in the workpiece model WM matched with the shape data $SD_2$ of the workpiece $W_2$ (step S23).

According to this configuration, after deleting the shape data $SD_1$ for which it is not necessary to execute verification of the mismatch (i.e., steps S22 to S24), it is possible to execute verification of the mismatch between the workpiece model WM matched at the time of acquisition of the position data $PD_{2\_2}$ of the next workpiece $W_2$ and the shape data $SD_2$ of the workpiece $W_2$. Therefore, verification of the mismatch can be performed with higher accuracy.

Note that step S31 may be omitted from the flow illustrated in FIG. 12, and the processor 32 may execute step S32 upon determining NO in step S23. Alternatively, step S32 may be omitted from the flow illustrated in FIG. 12, and the processor 32 may proceed to step S25 upon determining NO in step S31 or S23.

Figure 14:
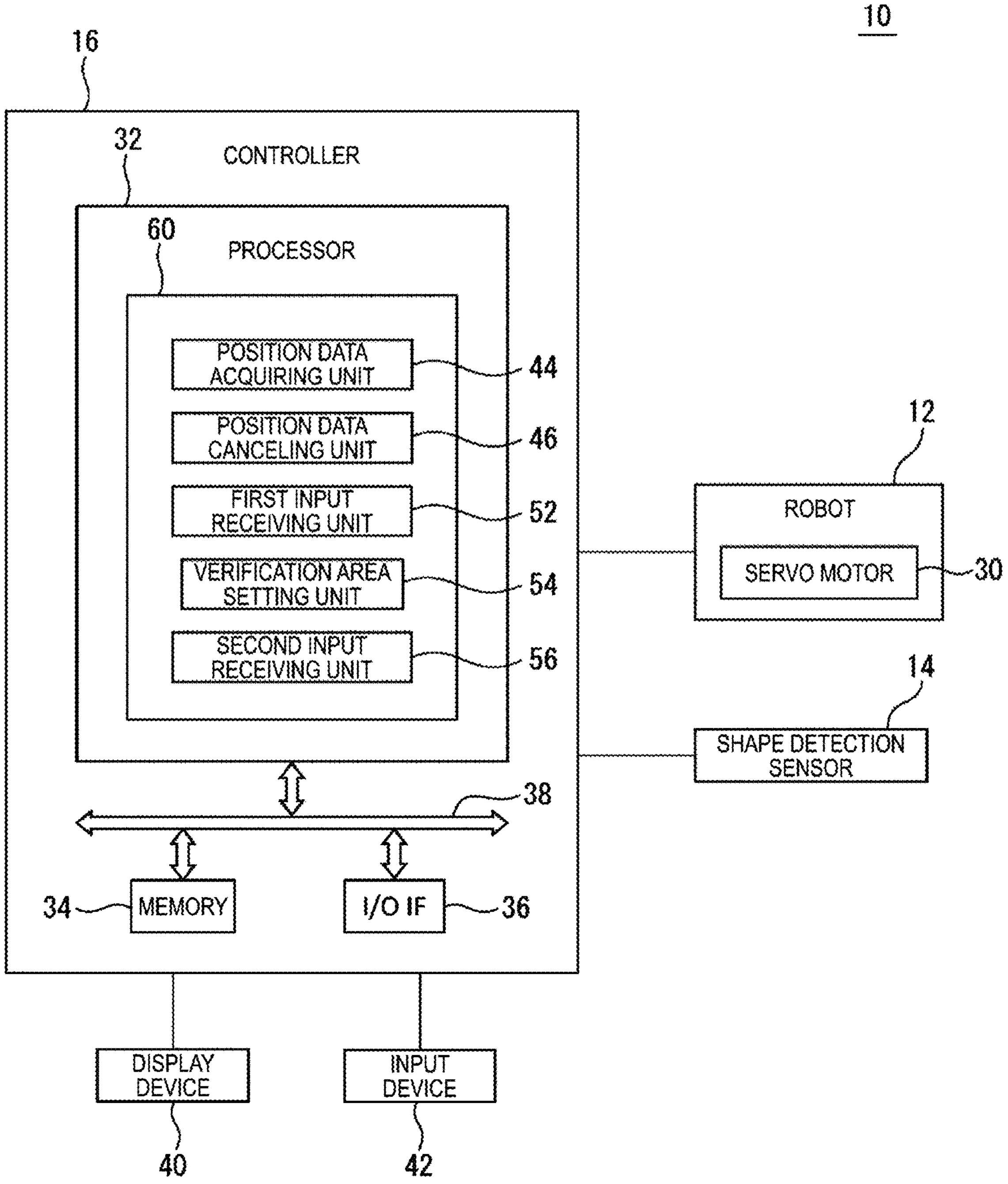
FIG. 14 is a block diagram illustrating other functions of the robot system illustrated in FIG. 2.

Next, other functions of the robot system 10 will be described with reference to FIGS. 14 and 15. In the present embodiment, before executing the flow of FIG. 4, the processor 32 executes the flow illustrated in FIG. 15 so as to set the above-described verification area VE in the workpiece model WM. The flow illustrated in FIG. 15 starts when the processor 32 receives a verification area setting command from the operator, the host controller, or the computer program PG. In step S41, the processor 32 acquires and displays the workpiece model WM (the CAD model $WM_C$ or the point cloud model $WM_P$) on the display device 40.

In step S42, the processor 32 determines whether or not an input IP1 for designating the verification area VE in the workpiece model WM has been received. Specifically, the operator operates the input device 42 while visually recognizing the workpiece model WM (the CAD model $WM_C$ or the point cloud model $WM_P$) displayed on the display device 40, thereby providing the input IP1 for designating the verification area VE in the workpiece model WM to the processor 32.

As described above, each of the workpieces W stacked in bulk in the container B has an area (in the present embodiment, the hole H) where another workpiece W (object) cannot enter, and the verification area VE is set in the workpiece model WM as an area corresponding to the unenterable area. The operator manually designates an area of the workpiece model WM corresponding to the unenterable area among areas of the workpiece model WM.

In the present embodiment, the operator operates the input device 42 to provide the processor 32 with the input IP1 for designating the hole model HM of the workpiece model WM as the verification area VE. In this case, the processor 32 may change the orientation of the workpiece model WM displayed on the display device 40 (i.e., the virtual line-of-sight direction VL in which the workpiece model WM is viewed) in response to the operator's input operation to the input device 42.

When the input IP1 is received through the input device 42, the processor 32 determines YES and proceeds to step S43, whereas the processor proceeds to step S44 upon determining NO. In this way, in the present embodiment, the processor functions as a first input receiving unit 52 (FIG. 14) configured to receive the input IP1 for designating the verification area VE in the workpiece model WM.

In step S43, the processor 32 sets the verification area VE in the workpiece model WM in response to the input IP1 received in the immediately preceding step S42. If the input IP1 for designating the hole model HM of the workpiece model WM is received in the immediately preceding step S42, as illustrated in FIG. 7, the processor 32 sets the entire area of the hole model HM as the verification area VE in response to the input IP1.

The processor 32 stores data of the set verification area VE in the memory 34 in association with the model data of the workpiece model WM as, for example, the coordinate data of the workpiece coordinate system C4. In this way, in the present embodiment, the processor 32 functions as a verification area setting unit 54 (FIG. 14) configured to set the verification area VE in the workpiece model WM in response to the input IP1.

Note that the processor 32 may generate the workpiece models WM in a plurality of orientations as illustrated in FIGS. 7 and 8 based on the workpiece model WM acquired in step S41, respectively, and may set the verification area VE in each of the generated workpiece models WM in the plurality of orientations in response to the input IP1. As a result, as illustrated in FIGS. 7 and 8, the verification area VE is set for each workpiece model WM in each orientation.

The processor 32 stores the data of the verification area VE set for each orientation of the workpiece model WM in the memory 34 in association with the workpiece model WM in each orientation. Then, the processor 32 functions as the position data acquiring unit 44 at the time of executing step S2 of FIG. 6, and in step S11, refers to the data of the verification area VE set for each orientation of the workpiece model WM and generates the workpiece models WM in the plurality of orientations in each of which the verification area VE is set. Then, in steps S13 and S14, the processor 32 matches the generated workpiece models WM in the plurality of orientations with the shape data $SD_n$ of the workpiece $W_n$ imaged in the detection data DD, respectively.

Referring to FIG. 15 again, in step S44, the processor 32 determines whether or not an input IP2 for designating the threshold value $\varepsilon_{th}$ (or the threshold value $DA_{th}$) used in the above-described step S23 has been received with respect to the verification area VE set in the workpiece model WM at this time point. Specifically, the operator operates the input device 42 to provide the processor 32 with an input IP2 for designating the threshold value $\varepsilon_{th}$ (or the threshold value $DA_{th}$) to be compared with the mismatch parameter $\varepsilon_n$ (or the data amount $DA_n$) in step S23 described above with respect to the verification area VE set in the workpiece model WM at this time point.

The processor 32 functions as the first input receiving unit 52, and receives the input IP2 from the operator through the input device 42. When the input IP2 is received, the processor 32 determines YES and proceeds to step S45, whereas the processor proceeds to step S46 upon determining NO.

In step S45, the processor 32 sets the threshold value $\varepsilon_{th}$ (or $DA_{th}$) for the verification area VE set in the workpiece model WM in response to the input IP2 received in the immediately preceding step S44. The processor 32 stores the data of the set threshold value $\varepsilon_{th}$ (or $DA_{th}$) in the memory 34 in association with the model data of the workpiece model WM and the data of the verification area VE.

In step S46, the processor 32 determines whether or not an input IP3 for correcting or deleting the verification area VE set in the workpiece model WM at this time point has been received. Specifically, the processor 32 displays the workpiece model WM and the verification area VE set in the workpiece model WM at this time point on the display device 40.

While visually recognizing the workpiece model WM and verification area VE displayed on the display device 40, the operator operates the input device 42 to provide an input IP3 for correcting the verification area VE to the processor 32. At this time, as the input IP3 for correcting the verification area VE, the operator may operate the input device 42 to input a coordinate value of the verification area VE in the workpiece coordinate system C4, or may perform a drag-and-drop operation on the verification area VE in the workpiece coordinate system C4 to displace, expand, or reduce the verification area VE. Alternatively, while visually recognizing the workpiece model WM and the verification area VE displayed on the display device 40, the operator operates the input device 42 to provide an input IP3 for deleting the set verification area VE to the processor 32.

If the processor 32 receives the input IP3 through the input device 42, the processor 32 determines YES and proceeds to step S47, whereas the processor 32 proceeds to step S48 upon determining NO. In this way, in the present embodiment, the processor 32 functions as a second input receiving unit 56 (FIG. 14) configured to receive the input IP3 for correcting or deleting the verification area VE.

In step S47, the processor 32 updates the data of the verification area VE (e.g., the coordinate data of the workpiece coordinate system C4) stored in the memory 34 by correcting or deleting the verification area VE set in the workpiece model WM at this time point in response to the input IP3 received in the immediately preceding step S46. Then, the processor 32 returns to step S42.

In step S48, the processor 32 determines whether or not an input IP4 for approving the verification area VE set in the workpiece model WM at this time point has been received. Specifically, the processor 32 displays the workpiece model WM and the verification area VE set in the workpiece model WM at this time point on the display device 40, together with an approval button image for approving the verification area VE.

While visually recognizing the workpiece model WM and the verification area VE displayed on the display device 40, the operator operates the input device 42 to provide an input IP4 for operating the approval button image to the processor 32. The processor 32 functions as the second input receiving unit 56 (FIG. 14), and receives the input IP4 through the input device 42.

Figure 15:
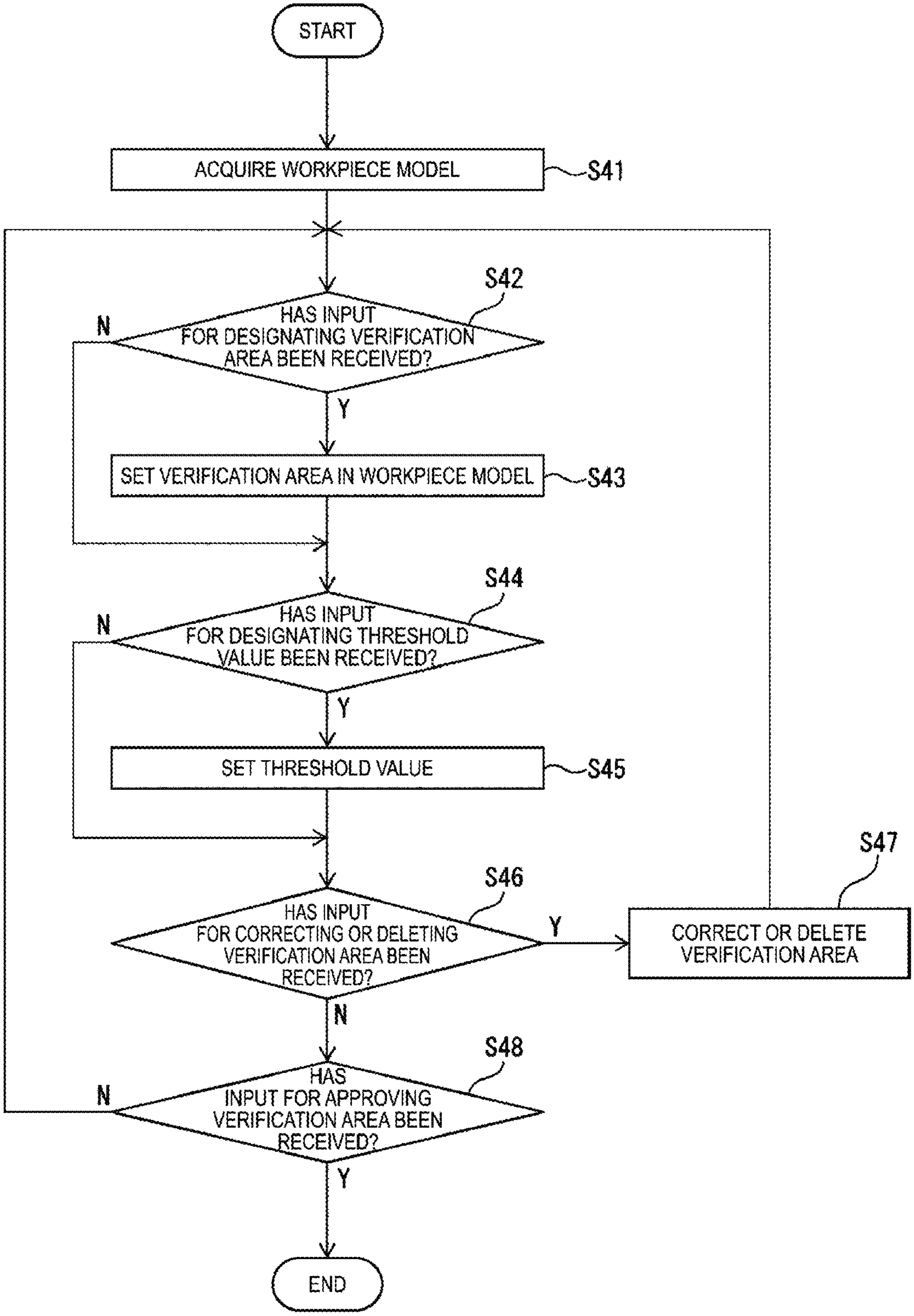
FIG. 15 is a flowchart illustrating an example of a method of setting a verification area in a workpiece model.

When the input IP4 is received, the processor 32 determines YES and ends the flow illustrated in FIG. 15, whereas the processor returns to step S42 upon determining NO. In this way, the processor 32 repeatedly executes steps S42 to S47 to sequentially execute setting, correction or deletion of the verification area VE and setting of the threshold value $\varepsilon_{th}$ (or $DA_{th}$), until determining YES in step S48.

Through the flow of FIG. 15, the operator can arbitrarily set the verification area VE and the threshold value $\varepsilon_{th}$ (or $DA_{th}$) in the workpiece model WM. After the flow of FIG. 15, the processor 32 executes the flow of FIG. 4 in response to the above-described work start command. Then, the processor 32 executes the above-described steps S2 and S3 based on the workpiece model WM in which the verification area VE is set by the flow of FIG. 15.

Figure 4:
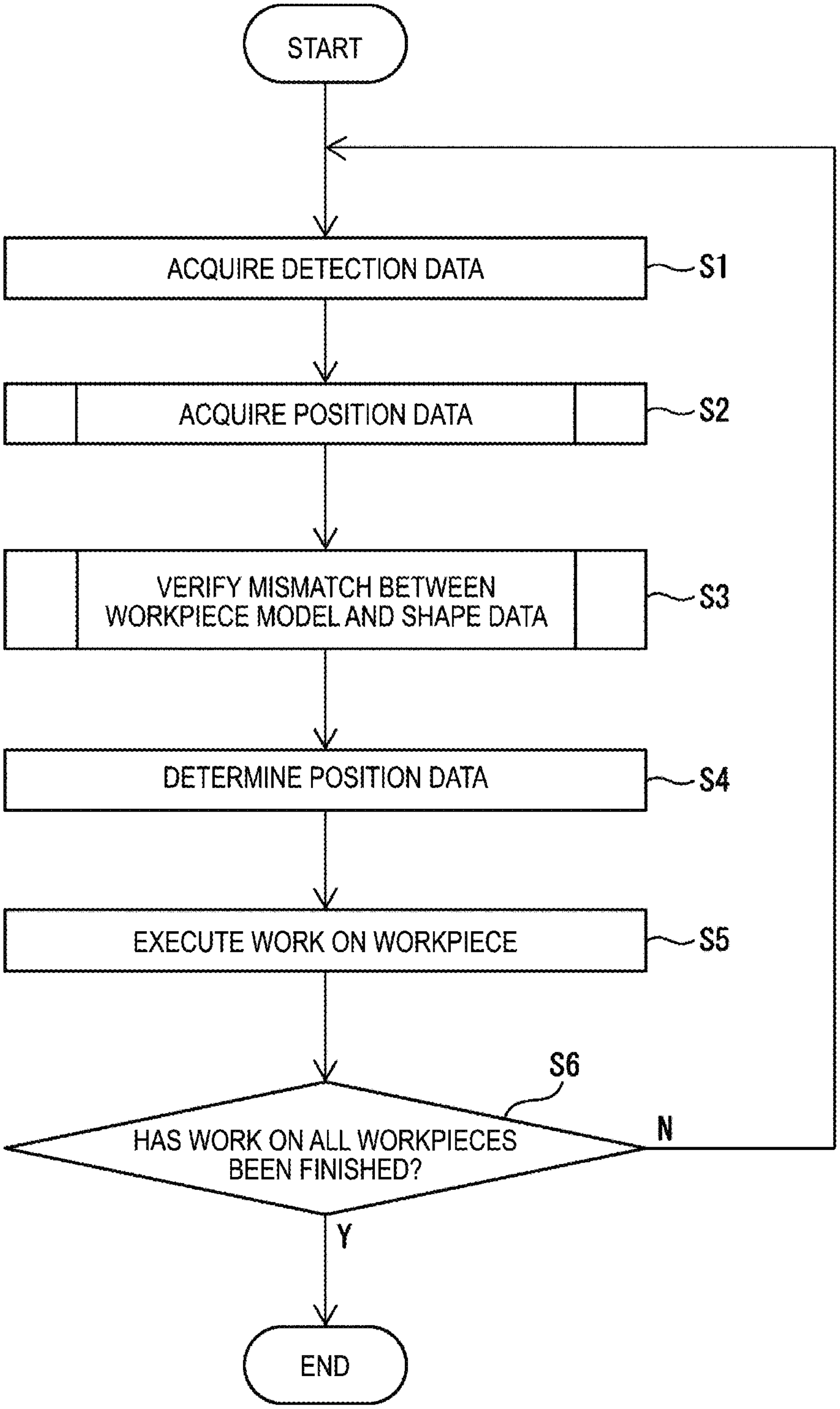
FIG. 4 is a flowchart illustrating an example of an operation flow of the robot system.

As described above, in the present embodiment, the processor 32 functions as the position data acquiring unit 44, the position data canceling unit 46, the first input receiving unit 52, the verification area setting unit 54, and the second input receiving unit 56, sets the verification area VE in the workpiece model WM in the flow of FIG. 15, and acquires the position data $PD_{1\_n}$ and $PD_{2\_n}$ of the workpiece $W_n$ based on the detection data DD of the shape detection sensor 14 in the flow of FIG. 4.

Therefore, the position data acquiring unit 44, the position data canceling unit 46, the first input receiving unit 52, the verification area setting unit 54, and the second input receiving unit 56 constitute a device 60 (FIG. 14) configured to acquire the position data $PD_{1\_n}$ and $PD_{2\_n}$ of the workpiece $W_n$ based on the detection data DD of the shape detection sensor 14.

In the device 60, the first input receiving unit 52 receives an input IP1 for designating the verification area VE in the workpiece model WM (step S42), and the verification area setting unit 54 sets the verification area VE in the workpiece model WM in response to the input IP1 received by the first input receiving unit 52 (step S43).

According to this configuration, the operator can examine an area in the workpiece W where another object (e.g., another workpiece W) cannot enter, and then arbitrarily set the verification area VE corresponding to the unenterable area in the workpiece model WM. As a result, it is possible to appropriately set the verification area VE to be focused on in the verification of the mismatch in step S3 described above.

In addition, in the device 60, when executing step S2 described above, the position data acquiring unit 44 generates each of the workpiece models WM in a plurality of orientations so as to execute the matching (step S11), and the verification area setting unit 54 sets the verification area VE for the workpiece model WM in each orientation (step S43). According to this configuration, when the workpiece models WM in a plurality of orientations are generated and matched with the shape data $SD_n$, it is possible to appropriately set the verification area VE in the workpiece model WM in each orientation.

In addition, in the device 60, the second input receiving unit 56 receives an input IP3 for correcting or deleting the verification area VE set by the verification area setting unit 54 or an input IP4 for approving the verification area VE (step S46 or S48). According to this configuration, the operator can appropriately correct, delete, or approve the set verification area VE, thereby easily setting a desired verification area VE.

Note that, in step S42, the processor 32 may receive an input for designating a plurality of verification areas $VE_j$ (j=1, 2, 3, . . . ) from the operator. For example, as illustrated in FIG. 16, the operator may operate the input device 42 to designate three verification areas $VE_1$, $VE_2$, and $VE_3$ in the hole model HM.

Figure 16:
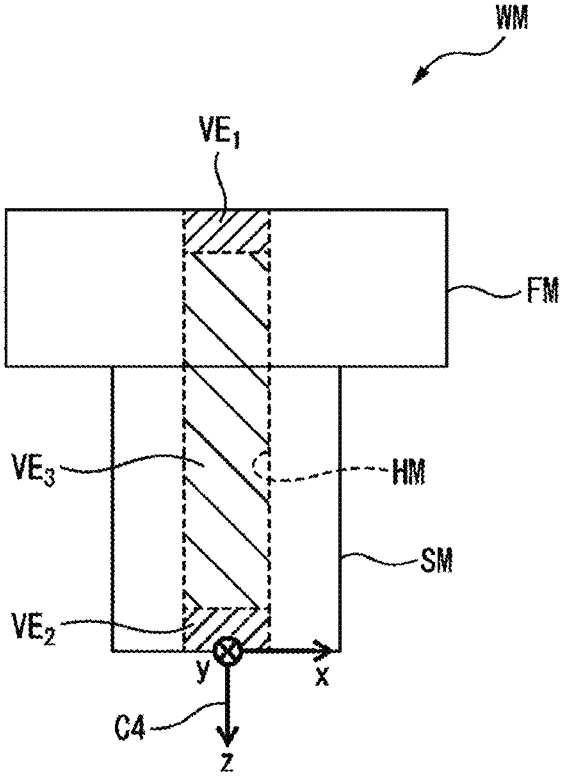
FIG. 16 illustrates a state in which a plurality of verification areas are set in a workpiece model.

In the example illustrated in FIG. 16, the verification area $VE_1$ is designated in one opening area of the hole model HM, and the verification area $VE_2$ is designated in another opening area of the hole model HM. The verification area $VE_3$ is designated in a central area of the hole model HM between the verification area $VE_1$ and the verification area $VE_2$. In step S42, the processor 32 may receive an input IP1 for designating such verification areas $VE_1$, $VE_2$, and $VE_3$, and in step S43, may set the verification areas $VE_1$, $VE_2$, and $VE_3$ in the hole model HM.

In this case, the operator may designate different threshold values $\varepsilon_{th\_m}$ (or $DA_{th}$ m) for the verification areas $VE_1$, $VE_2$, and $VE_3$, respectively, in step S44. For example, the operator operates the input device 42 to set the threshold value $\varepsilon_{th\_1}$ for the verification area $VE_1$, set the threshold value $\varepsilon_{th\_2}$ for the verification area $VE_2$, and set the threshold value $\varepsilon_{th\_3}$ for the verification area $VE_3$. In this case, the threshold value $\varepsilon_{th\_3}$ may be set to a value smaller than the threshold values $\varepsilon_{th\_1}$ and $\varepsilon_{th\_2}$.

In this case, in step S22 described above, the processor 32 calculates a data amount $DA_{n\_1}$ of the shape data $SD_m$ in the verification area $VE_1$, a data amount $DA_{n\_2}$ of the shape data $SD_m$ in the verification area $VE_2$, and a data amount $DA_{n\_3}$ of the shape data $SD_m$ in the verification area $VE_3$, respectively.

Next, in step S23, the processor 32 obtains a mismatch parameter $\varepsilon_{n\_1}$ ($=DA_{n\_1}/DA_w$) of the verification area $VE_1$, a mismatch parameter $\varepsilon_{n\_2}$ ($=DA_{n\_2}/DA_w$) of the verification area $VE_2$, and a mismatch parameter $\varepsilon_{n\_3}$ ($=DA_{n\_3}/DA_w$) of the verification area $VE_3$ by the calculation of Formula 1 described above, respectively. Then, the processor 32 may compare the obtained mismatch parameters $\varepsilon_{n\_1}$, $\varepsilon_{n\_2}$, and $\varepsilon_{n\_3}$ with the threshold values $\varepsilon_{th\_1}$, $\varepsilon_{th\_2}$, and $\varepsilon_{th\_3}$ set in step S45, respectively, and determine YES when $\varepsilon_n\_1=\varepsilon_{th\_1}$, $\varepsilon_n\_2=\varepsilon_{th\_2}$, Of $\varepsilon_n$ $3=\varepsilon_{th\_3}$.

Here, when the workpiece model WM in which the plurality of verification areas $VE_1$, $VE_2$, and $VE_3$ illustrated in FIG. 16 are set is matched with the shape data $SD_n$, it is estimated that a point cloud of other shape data $SD_m$ is likely to be present in the verification areas $VE_1$ and $VE_2$ close to the opening of the hole model HM. On the other hand, it is estimated that the point cloud of the shape data $SD_m$ is unlikely to be present in the verification area $VE_3$ set in the central area of the hole model HM.

Therefore, by setting the threshold value $\varepsilon_{th\_3}$ to a value smaller than the threshold values $\varepsilon_{th\_1}$ and $\varepsilon_{th\_2}$ as described above, the mismatch between the workpiece model WM and the shape data $SD_n$ can be verified in detail for each of the verification areas $VE_1$, $VE_2$, and $VE_3$. Note that the threshold values $\varepsilon_{th\_1}$ and $\varepsilon_{th\_2}$ may be set to the same value.

Note that, in the above-described embodiment, the case where an area of the workpiece W where another object (e.g., another workpiece W) cannot enter is the hole H has been described. However, no limitation is intended thereto, and a solid portion of the workpiece W (i.e., a solid portion of the shaft portion S or the flange portion F) may also be an area where another object (e.g., another workpiece W) cannot enter. Therefore, in step S42 described above, the operator may set a solid portion of the shaft portion model SM or the flange portion model FM in the workpiece model WM as the verification area VE as an area corresponding to the unenterable area.

Alternatively, in step S42, the operator may set the hole model HM of the workpiece model WM as the verification area $VE_1$ and set the solid portion of the workpiece model WM as the verification area $VE_2$. In this case, in step S44, the operator may designate threshold values $\varepsilon_{th\_1}$ and $\varepsilon_{th\_2}$ (or threshold values $DA_{th\_1}$ and $DA_{th\_2}$) different from each other for the verification area $VE_1$ set in the hole model HM and the verification area $VE_2$ set in the solid portion of the workpiece model WM, respectively.

Note that step S42 may be omitted from the flow illustrated in FIG. 15. In this case, in step S43, the processor 32 may generate the workpiece models WM in the plurality of orientations as illustrated in FIGS. 7 and 8, respectively, based on the workpiece model WM acquired in step S41, analyze the workpiece models WM, and automatically set the verification area VE for the workpiece models WM in the respective orientations. In this case, the first input receiving unit 52 can be omitted from the device 60.

Below, a method of automatically setting the verification area VE will be described. Specifically, the processor 50 omits step S42 in FIG. 15, functions as the verification area setting unit 54 in step S43, and automatically sets the verification area VE in the workpiece model WM based on the workpiece model WM.

As an example, the processor 50 sets an envelope shape model covering the workpiece model WM from an outer side for the workpiece model WM. Then, the processor 50 may automatically set, as the verification area VE, an area that is present inside the workpiece model WM by a predetermined distance from a boundary between the set envelope shape model and the workpiece model WM.

As another example, in step S43, the processor 50 analyzes the workpiece model WM and extracts a solid portion (a solid portion of the shaft portion S or the flange portion F) of the workpiece model WM. Then, the processor 50 may automatically set the extracted solid portion as the verification area VE.

As still another example, in step S43, the processor 50 arranges a virtual surface model (a model of a virtual surface of a flat surface or a curved surface) on the workpiece model WM in a virtual three-dimensional space determined by the workpiece coordinate system C4. Then, the processor 50 extracts an area (e.g., the hole model HM) that is closed by the virtual surface model and changes into a solid area. The processor 50 may automatically set the extracted area as the verification area VE. As described above, the processor 50 functions as the verification area setting unit 54 and automatically sets the verification area VE in the workpiece model WM based on the workpiece model WM.

Note that step S44 may be omitted from the flow illustrated in FIG. 15. In this case, in step S45, the processor 32 may automatically set the threshold value $\varepsilon_{th}$ (or the threshold value $DA_{th}$) for the verification area VE as a predetermined constant, for example. In addition, steps S46 to S48 may be omitted from the flow illustrated in FIG. 15. In this case, the second input receiving unit 56 can be omitted from the device 60.

Figure 17:
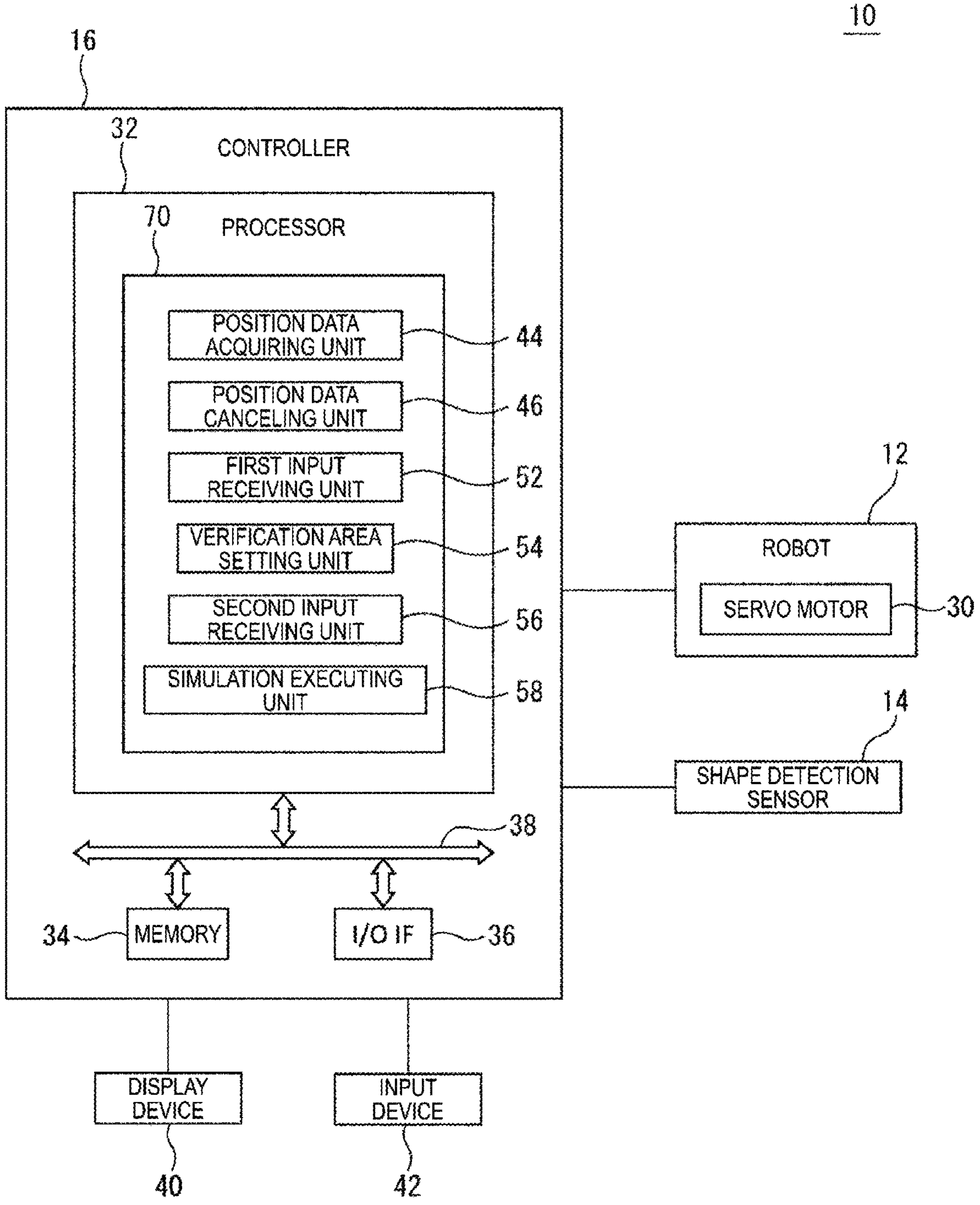
FIG. 17 is a block diagram illustrating still other functions of the robot system illustrated in FIG. 2.

Next, other functions of the robot system 10 will be described with reference to FIGS. 17 and 18. In the present embodiment, the processor 32 executes the flow illustrated in FIG. 18, instead of the flow in FIG. 15. Note that, in the flow illustrated in FIG. 18, processing similar to that of the flow in FIG. 15 is denoted by the identical step number, and redundant description thereof will be omitted.

Figure 18:
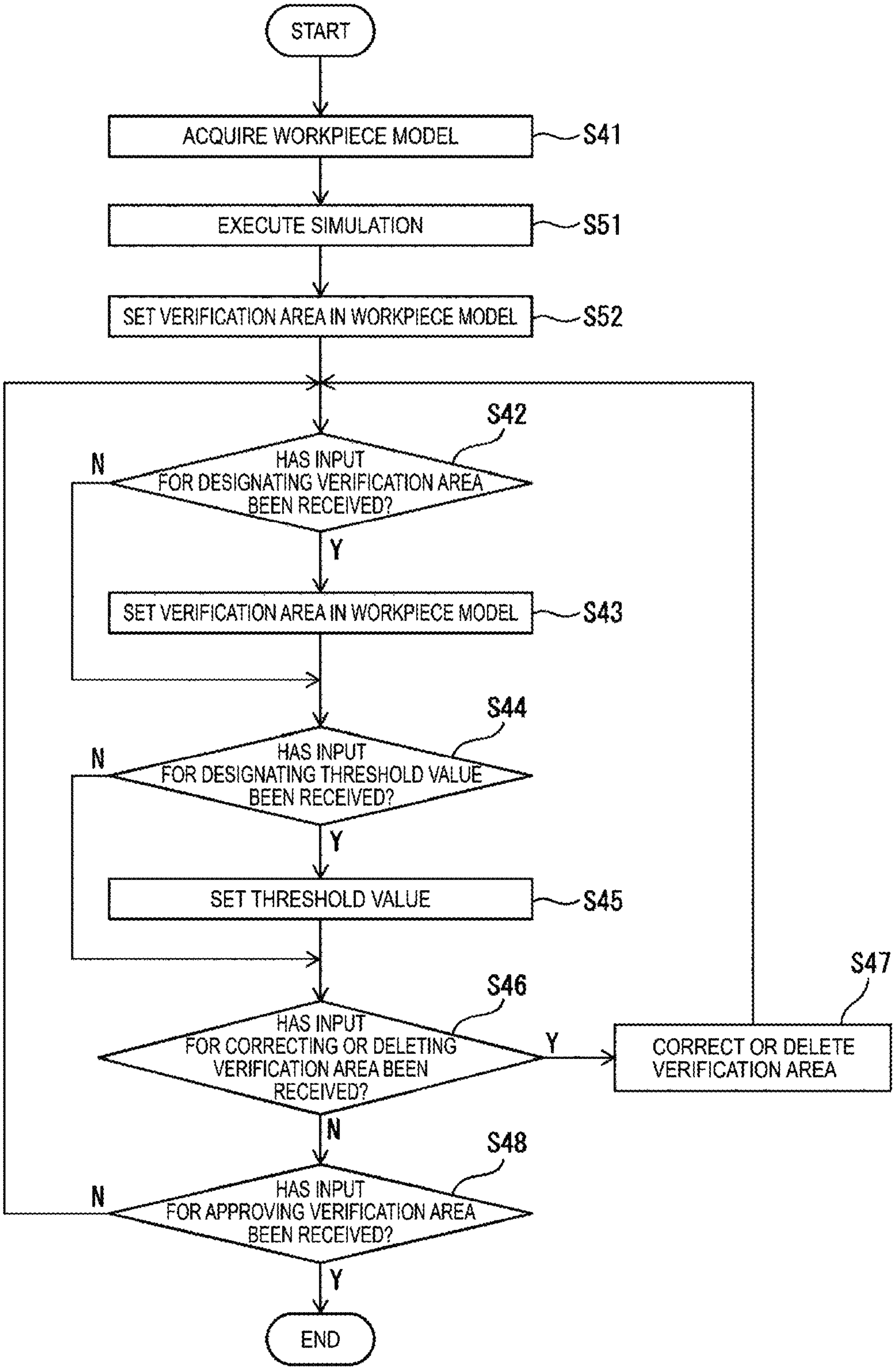
FIG. 18 is a flowchart illustrating another example of the method of setting a verification area in a workpiece model.
Figure 19:
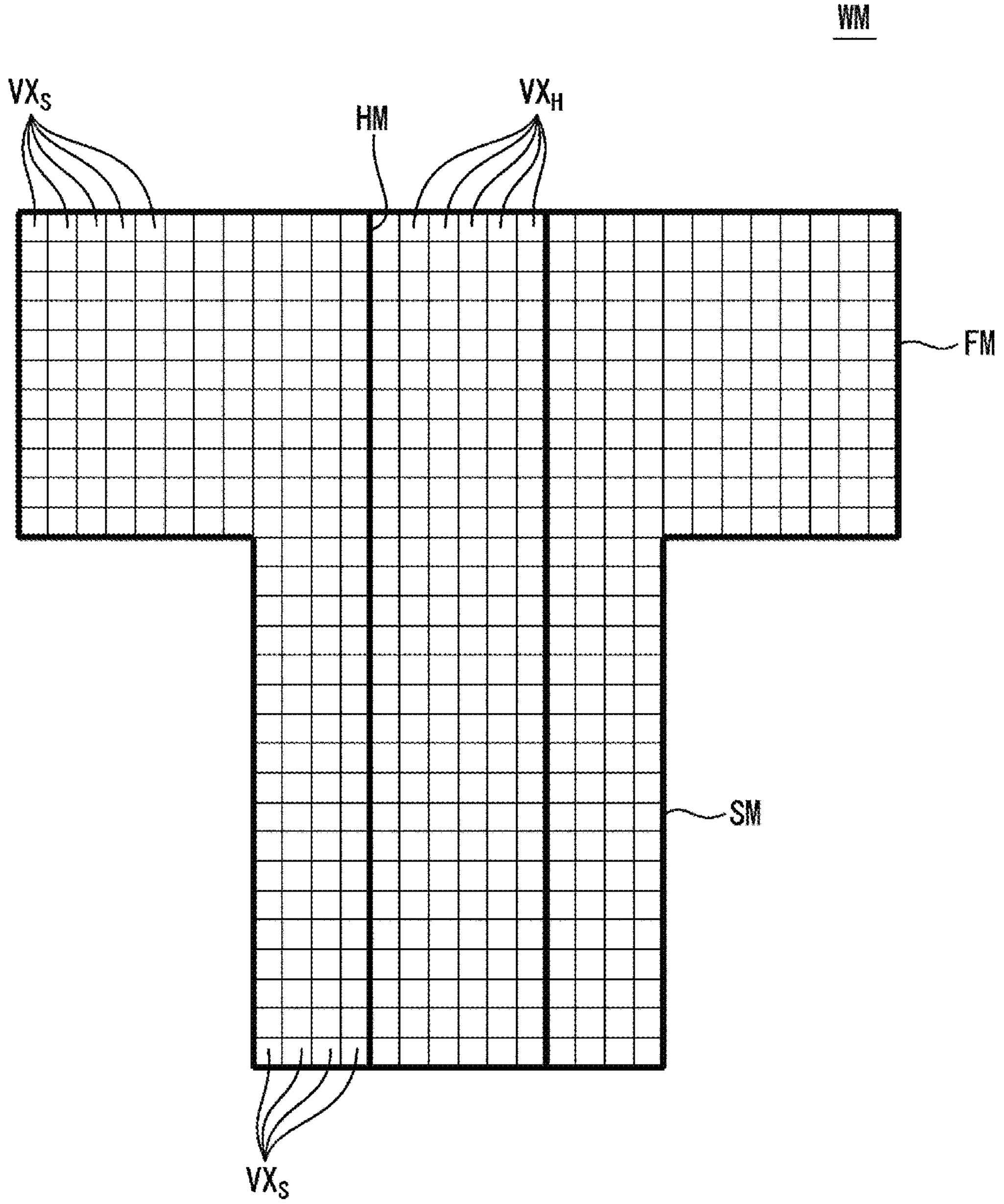
FIG. 19 illustrates a state in which a workpiece model is quantized into unit voxels.

In the flow illustrated in FIG. 18, after step S41, in step S51, the processor 32 executes a simulation SL in which a plurality of workpiece models WM are brought into contact with each other. Specifically, first, the processor 32 quantizes the workpiece model WM acquired in step S41 into voxels VX that are unit-volume cubes as illustrated in FIG. 19. As a result, the solid portion of the workpiece model WM (specifically, the shaft portion model SM and the flange portion model FM) is quantized into voxels $VX_S$, and the hole model HM of the workpiece model WM is quantized into voxels $VX_H$.

Figure 20:
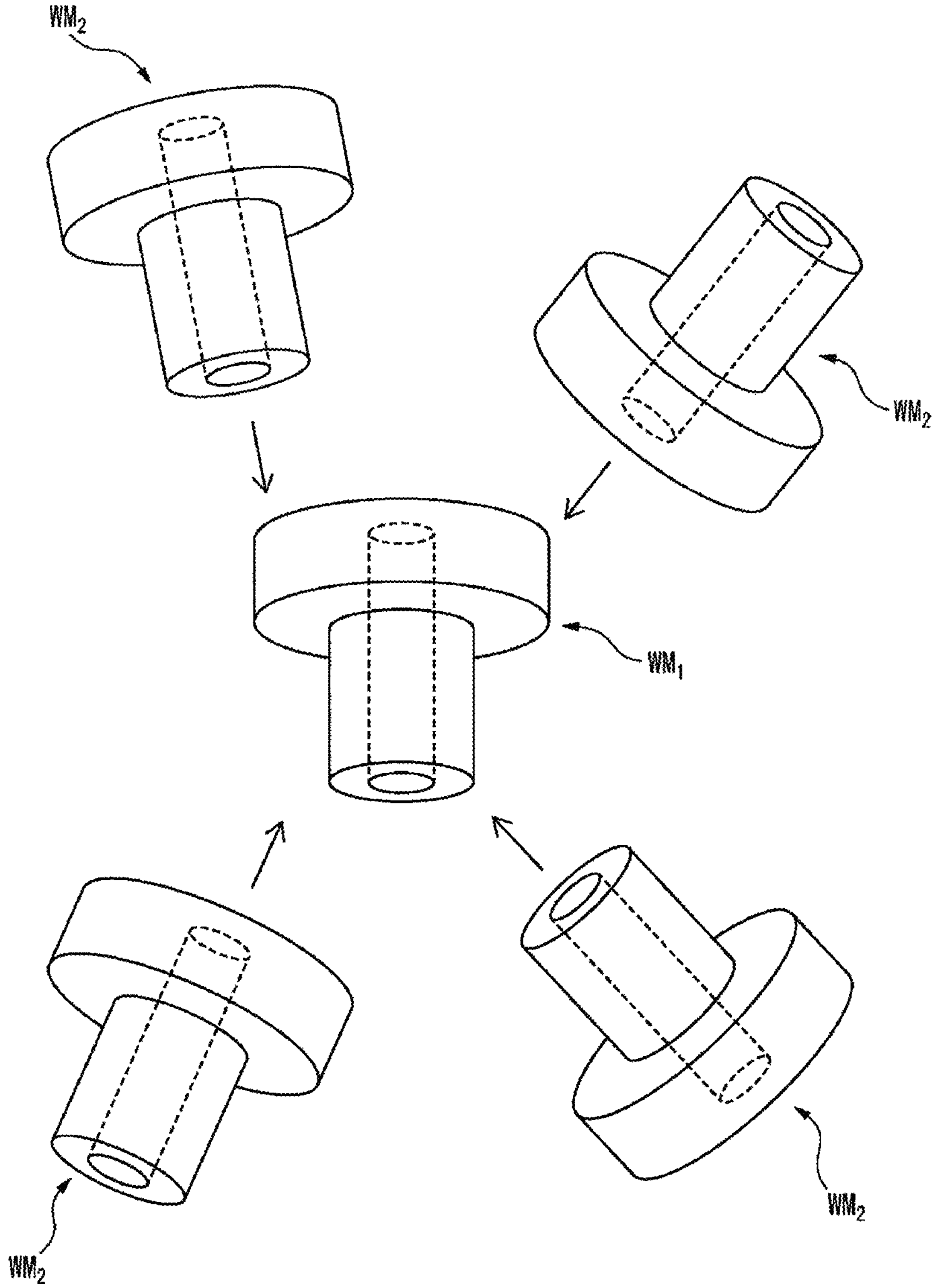
FIG. 20 is a diagram for illustrating a simulation of step S51 in FIG. 18.

Next, as illustrated in FIG. 20, the processor 32 repeatedly executes the simulation SL in which the quantized workpiece model $WM_2$ is brought into contact with the quantized workpiece model $WM_1$ in various orientations from various directions. That is, in the present embodiment, the processor 32 functions as a simulation executing unit 58 (FIG. 17) configured to execute the simulation SL of bringing the workpiece model $WM_2$ into contact with the workpiece model $WM_1$.

In step S52, the processor 32 functions as the verification area setting unit 54 and sets the verification area VE in the workpiece model WM based on a result of the simulation of step S51. Specifically, in a case where at least one voxel $VX_S$ of the solid portion of the workpiece model $WM_2$ enters one voxel $VX_H$ of the hole model HM of the workpiece model $WM_1$ when the simulation SL is executed once in step S51, the processor 32 increments a score SC of the one voxel $VX_H$ by "1".

The score SC represents the number of times that the voxel $VX_S$ of the workpiece model $WM_2$ enters one voxel $VX_H$ of the workpiece model $WM_1$ in one simulation SL of step S51. Therefore, an initial value of the score SC of the voxel $VX_H$ is 0 (SC=0), and when the voxel $VX_S$ of the workpiece model $WM_2$ enters one voxel $VX_H$ of the workpiece model $WM_1$ in one simulation of step S51, the score SC of the one voxel $VX_H$ is incremented by "1" and becomes 1 (SC=1).

The processor 32 calculates the score SC of each voxel $VX_H$ of the workpiece model $WM_1$ each time the simulation SL is executed in step S51. When all the simulations SL in step S51 are finished, the processor 32 substitutes the score SC of each voxel $VX_H$ of the workpiece model $WM_1$ into the following Formula 2 to calculate a score determination value η for each voxel $VX_H$.

$$\eta = SC / i \qquad \text{(Formula 2)}$$

Here, i in Formula 2 represents the number of times of the simulation SL (in other words, the number of workpiece models $WM_2$ in various orientations used in the simulation SC). Then, the processor 32 functions as the verification area setting unit 54, determines whether or not the score determination value η of each voxel $VX_H$ obtained by the calculation of Formula 2 is equal to or less than a predetermined threshold value $\eta_{th}$, and sets the voxel $VX_H$ satisfying $\eta \leq \eta_{th}$ as the verification area VE. As a result, at least one (e.g., all) of the voxels $VX_H$ of the hole model HM illustrated in FIG. 19 is set as the verification area VE.

Note that Formula 2 described above can be modified to Formula of η=SC/i×100. In addition, the processor 32 may determine whether or not the above-described score SC is equal to or less than a predetermined threshold value $SC_{th}$, and set a voxel $VX_H$ satisfying $SC \leq\leq SC_{th}$ as the verification area VE. In this way, in step S52, the processor 32 functions as the verification area setting unit 54 and sets the verification area VE in the workpiece model WM based on the result of the simulation (specifically, the score SC and the score determination value η) in step S51.

After step S52, the processor 32 executes the above-described steps S42 to S48, and executes a process of designating a further verification area VE (step S42), setting a threshold value $\varepsilon_{th}$ or $DA_{th}$ for the verification area VE (step S45), correcting or deleting the verification area VE (step S47), or approving the verification area VE (step S48), based on the verification area VE set based on the simulation result.

As described above, in the present embodiment, the processor 32 functions as the position data acquiring unit 44, the position data canceling unit 46, the first input receiving unit 52, the verification area setting unit 54, the second input receiving unit 56, and the simulation executing unit 58, and sets the verification area VE in the workpiece model WM in the flow of FIG. 18, and then executes the flow of FIG. 4 to acquire the position data $PD_{1\_n}$ and $PD_{2\_n}$ of the workpiece $W_n$ based on the detection data DD of the shape detection sensor 14.

Therefore, the position data acquiring unit 44, the position data canceling unit 46, the first input receiving unit 52, the verification area setting unit 54, the second input receiving unit 56, and the simulation executing unit 58 constitute a device 70 (FIG. 16) configured to acquire the position data $PD_{1\_n}$ and $PD_{2\_n}$ of the workpiece $W_n$ based on the detection data DD of the shape detection sensor 14.

In the device 70, the simulation executing unit 58 executes the simulation SL in which the workpiece model $WM_2$ (object model) is brought into contact with the workpiece model $WM_1$ (step S51), and the verification area setting unit 54 sets the verification area VE in the workpiece model WM based on a result of the simulation (the score SC and the score determination value η) executed by the simulation executing unit 58. According to this configuration, the verification area VE can be automatically set in the workpiece model WM with high accuracy.

Note that, in the present embodiment, the case where the simulation SL in which the two workpiece models $WM_1$ and $WM_2$ are brought into contact with each other is executed in step S51 has been described. However, no limitation is intended thereto, and, in step S51, the processor 32 may execute the simulation SL in which three or more workpiece models $WM_k$ (k=1, 2, 3, . . . ) are brought into contact with each other.

Alternatively, in step S51, the processor 32 may execute the simulation SL in which the plurality of workpiece models $WM_k$ are simulatively stacked in bulk in a container model BM modeling the container B illustrated in FIG. 1 and the arrangement and orientation of the plurality of workpiece models $WM_k$ stacked in bulk are repeatedly changed.

Note that the processor 32 may execute the flow illustrated in FIG. 4, 15, or 18 in accordance with the computer program PG stored in advance in the memory 34. In addition, the functions of the device 50, 60, or 70 (i.e., the position data acquiring unit 44, the position data canceling unit 46, the first input receiving unit 52, the verification area setting unit 54, the second input receiving unit 56, and the simulation executing unit 58) executed by the processor 32 may be functional modules implemented by the computer program PG. The computer program PG may be provided as being recorded in a non-transitory computer-readable recording medium such as a semiconductor memory, a magnetic recording medium, or an optical recording medium.

In the above-described embodiment, the case where the functions of the device 50, 60, or 70 (i.e., the position data acquiring unit 44, the position data canceling unit 46, the first input receiving unit 52, the verification area setting unit 54, the second input receiving unit 56, and the simulation executing unit 58) are implemented in the controller 16 has been described.

However, no limitation is intended thereto, and the functions of the device 50, 60, or 70 may be implemented in any other computer such as a teaching device (a teaching pendant, a tablet mobile device, or the like) that teaches the robot 12 an operation for the work of step S5, or a personal computer (PC). In this case, a processor of the computer such as a teaching pendant or a PC functions as the device 50, 60, or 70.

Note that, in the above-described embodiment, the case where the processor 32 executes step S3 after step S2 (more specifically, step S15) in the flow of FIG. 4 has been described. However, no limitation is intended thereto, and the processor 32 may execute step S3 after step S13 or S14 in FIG. 6.

For example, when executing step S3 after step S13, the processor 32 calculates the data amount $DA_n$ of the shape data $SD_m$ in the verification area VE defined in the workpiece model WM matched at the time of acquiring the initial position data $PD_{1\_n}$ of the workpiece $W_n$ in step S22 (FIG. 11 or 12) of step S3. When the processor 32 determines YES in step S23, in step S24, the processor may invalidate (e.g., delete) the initial position data $PD_{1\_n}$ of the workpiece $W_n$ acquired in step S13.

Note that the rough search RS in step S13 and the precise search PR in step S14 described above are examples of a method of acquiring the position data PD of the workpiece W, and any modification may be made to the rough search RS or the precise search PR, or the position data PD of the workpiece W may be acquired by any other method in which the rough search RS and the precise search PR are not executed.

In addition, various changes can be made to the flows illustrated in FIG. 4, 6, 11, 12, 15, or 18. For example, step S12 or S15 may be omitted from the flow illustrated in FIG. 6. In addition, step S22 may be omitted from step S3 (FIGS. 11 and 12) described above, and in step S23, the processor 32 may determine whether or not the shape data $SD_m$ is present in the verification area VE, based on the coordinates in the sensor coordinate system C3 of the verification area VE of the matched workpiece model WM and the point cloud of the shape data $SD_m$.

Note that, in the above-described embodiment, the case where the object adjacent to one workpiece W (e.g., the workpiece $W_1$) is the second workpiece W (the workpiece $W_2$) different from the one workpiece W has been described. However, no limitation is intended thereto, and the object adjacent to one workpiece W may be, for example, a jig arranged in the container B, a protrusion protruding from an inner wall of the container B, or the like. In this case, for example, when an object such as a jig or a protrusion cannot enter the hole H of the workpiece W, the hole model HM of the workpiece model WM corresponding to the hole H can be defined as the above-described verification area VE. In addition, the workpiece W illustrated in FIG. 3 is an example, and may have any other shape.

Note that, in the above-described embodiment, the case where the shape detection sensor 14 is fixed to the end effector 28 (or the wrist flange 26*b*) and moved by the robot 12 has been described. However, no limitation is intended thereto, and the shape detection sensor 14 may be fixed at a known position of the robot coordinate system C1 using, for example, a support structure. In addition, the shape detection sensor 14 is not limited to the three-dimensional vision sensor but may be a laser scanner that can detect a three-dimensional shape of an object.

Alternatively, the shape detection sensor 14 may include a two-dimensional camera and a distance measuring sensor capable of measuring the distance d to the object. In addition, the detection data DD detected by the shape detection sensor 14 is not limited to the three-dimensional point cloud image data as illustrated in FIG. 5 but may include a data set of two-dimensional image data imaged by a two-dimensional camera and the distance d measured by a distance measuring sensor, or may be any other type of image data (e.g., distance image data).

Further, the robot 12 is not limited to being the vertical articulated robot, and may be any other type of robot, such as a horizontal articulated robot, a parallel link robot, or the like. Although the present disclosure has been described through embodiments above, the embodiments described above do not limit the scope of the invention claimed in the claims.

REFERENCE SIGNS LIST

10 Robot system
12 Robot
14 Shape detection sensor
16 Controller
32: Processor
44: Position data acquiring unit
46: Position data canceling unit
50, 60, 70: Device
52: First input receiving unit
54: Verification area setting unit
56: Second input receiving unit
58: Simulation executing unit

The invention claimed is:

1. A device configured to acquire position data of a workpiece based on detection data of a shape detection sensor configured to detect shapes of an object and the workpiece, the workpiece being adjacent to the object and having an area where the object cannot enter, the device comprising a processor configured to:

acquire the position data by matching a workpiece model, which models the workpiece and in which a verification area corresponding to the area where the object cannot enter is defined, with shape data of the workpiece included in the detection data; and invalidate the acquired position data when shape data of the object included in the detection data is present in the verification area defined in the workpiece model matched with the shape data of the workpiece, wherein a robot is controlled so as to cancel a work on the workpiece for which the invalidated position data is acquired.

2. The device of claim 1, wherein the processor is further configured to:

receive an input for designating the verification area in the workpiece model; and set the verification area in the workpiece model in response to the received input.

3. The device of claim 2, wherein the processor is configured to:

generate the workpiece models in a plurality of orientations respectively, in order to execute the matching; and set the verification area for the workpiece model in each orientation.

4. The device of claim 2, wherein the processor is further configured to receive an input for correcting, deleting, or approving the set verification area.

5. The device of claim 1, wherein the processor is further configured to automatically set the verification area in the workpiece model based on the workpiece model.

6. The device of claim 5, wherein the processor is further configured to:

execute a simulation in which an object model which models the object is brought into contact with the workpiece model; and set the verification area in the workpiece model based on a result of the simulation.

7. The device of claim 1, wherein the processor is configured to:

calculate a data amount of shape data of the object in the verification area defined in the matched workpiece model; and determine whether or not the shape data of the object is present in the verification area, based on the calculated data amount.

8. The device of claim 7, wherein the processor is configured to determine whether or not the shape data of the object is present in the verification area, by executing a predetermined calculation using the calculated data amount and a data amount of the workpiece model.

9. The device of claim 7, wherein the processor is configured to determine whether or not to calculate the data amount based on a detection result parameter indicating a result of the matching or an orientation or position of the matched workpiece model.

10. The device of claim 1, wherein the object is a second workpiece different from the workpiece.

11. The device of claim 1, wherein the processor is configured to:

acquire position data of a third workpiece different from the workpiece, by matching the workpiece model with shape data of the third workpiece included in the detection data;

delete the shape data of the third workpiece from the detection data after acquiring the position data of the third workpiece; and determine whether or not the shape data of the object included in the detection data, from which the shape data of the third workpiece is deleted, is present in the verification area defined in the matched workpiece model.

12. A controller of a robot, comprising a device configured to acquire position data of a workpiece based on detection data of a shape detection sensor configured to detect shapes of an object and the workpiece, the workpiece being adjacent to the object and having an area where the object cannot enter, the device comprising a processor configured to:

acquire the position data by matching a workpiece model, which models the workpiece and in which a verification area corresponding to the area where the object cannot enter is defined, with shape data of the workpiece included in the detection data; and invalidate the acquired position data when shape data of the object included in the detection data is present in the verification area defined in the workpiece model matched with the shape data of the workpiece, wherein a robot is controlled so as to cancel a work on the workpiece for which the invalidated position data is acquired.

13. A robot system, comprising:

a robot configured to perform predetermined work on a workpiece;

a shape detection sensor configured to detect a shape of the workpiece; and the controller of claim 12, configured to control the robot to execute the predetermined work based on detection data of the shape detection sensor.

14. A method of acquiring position data of a workpiece based on detection data of a shape detection sensor configured to detect shapes of an object and the workpiece, the workpiece being adjacent to the object and having an area where the object cannot enter, the method comprising:

acquiring, by a processor, the position data by matching a workpiece model, which models the workpiece and in which a verification area corresponding to the area where the object cannot enter is defined, with shape data of the workpiece included in the detection data; and invalidating, by the processor, the acquired position data when shape data of the object included in the detection data is present in the verification area defined in the workpiece model matched with the shape data of the workpiece wherein a robot is controlled so as to cancel a work on the workpiece for which the invalidated position data is acquired.

15. A non-transitory computer-readable recording medium configured to record a computer program configured to cause the processor to execute the method of claim 14.

* * * * *